United States Patent
Mogi

(10) Patent No.: US 9,494,775 B2
(45) Date of Patent: Nov. 15, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Shuichi Mogi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 14/608,818

(22) Filed: Jan. 29, 2015

(65) Prior Publication Data

US 2015/0219883 A1 Aug. 6, 2015

(30) Foreign Application Priority Data

Jan. 31, 2014 (JP) ................. 2014-017754

(51) Int. Cl.
*G02B 15/14* (2006.01)
*G02B 15/173* (2006.01)

(52) U.S. Cl.
CPC ................. *G02B 15/173* (2013.01)

(58) Field of Classification Search
USPC .................................. 359/683, 685
See application file for complete search history.

(56) References Cited

FOREIGN PATENT DOCUMENTS

JP 2012-047814 A 3/2012

*Primary Examiner* — Jack Dinh
(74) *Attorney, Agent, or Firm* — Canon USA, Inc. I.P. Division

(57) ABSTRACT

A zoom lens includes, from an object side to an image side, a first lens unit having positive refractive power, a second lens unit having negative refractive power, a third lens unit having positive refractive power, an aperture stop, a fourth lens unit having positive refractive power, and a fifth lens unit having negative refractive power. The distance between adjacent lens units changes during zooming. The third lens unit includes at least one positive lens and further includes at least one negative lens at the image side of the positive lens. A focal length of the second lens unit, a focal length of the fifth lens unit, a combined focal length of lenses disposed at the object side of the aperture stop at a wide-angle end, and a combined focal length of lenses disposed at the image side of the aperture stop at the wide-angle end are suitably set.

9 Claims, 21 Drawing Sheets

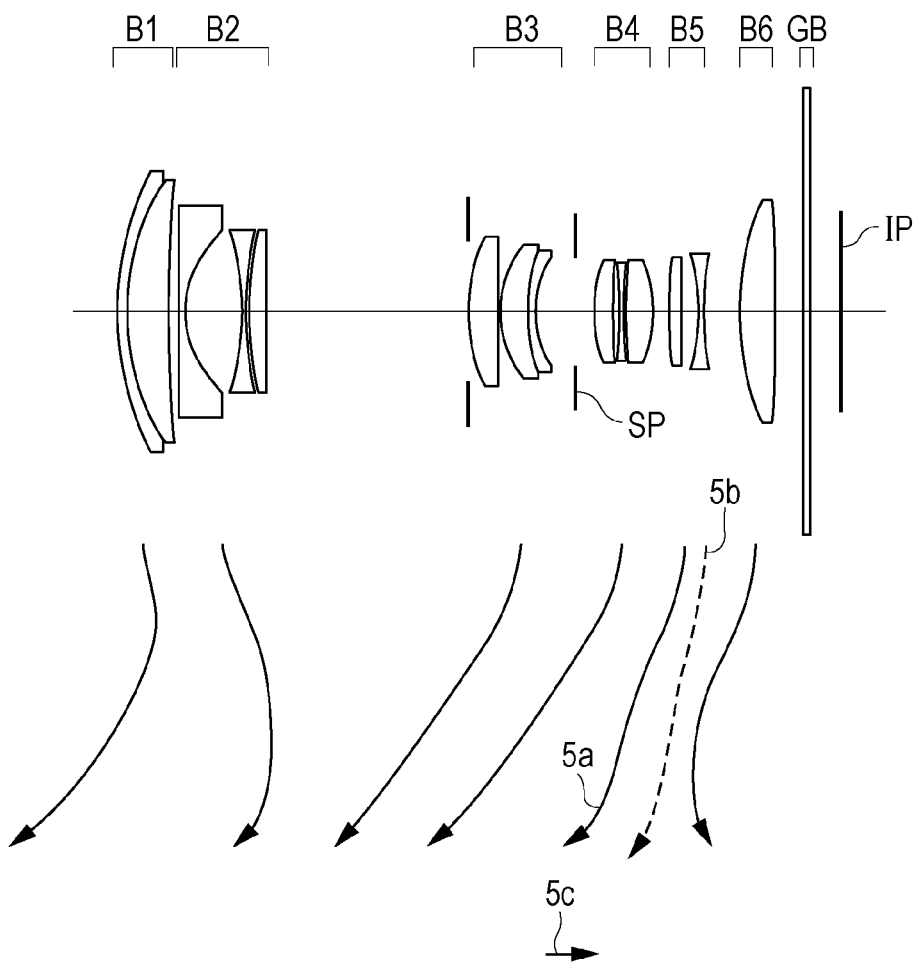

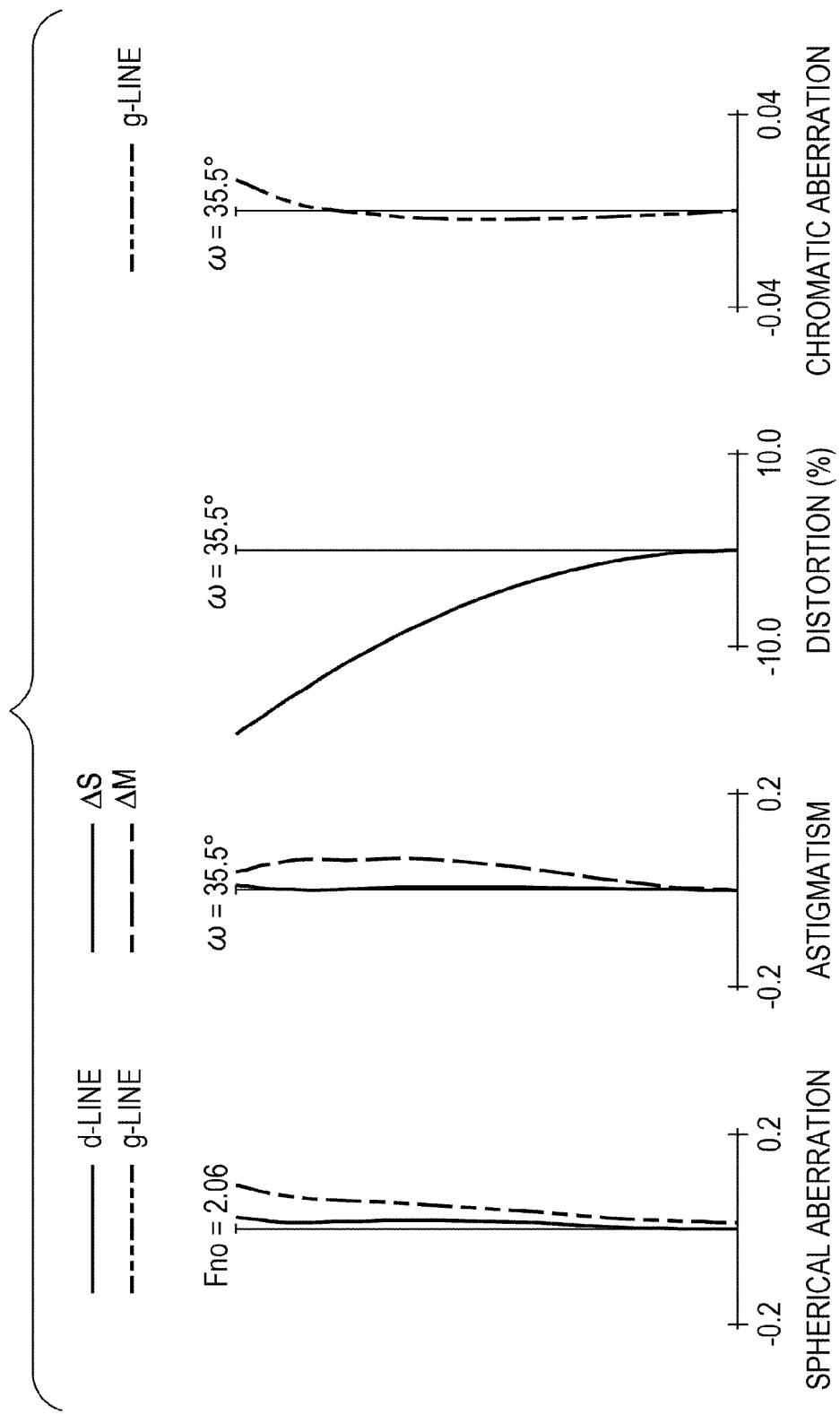

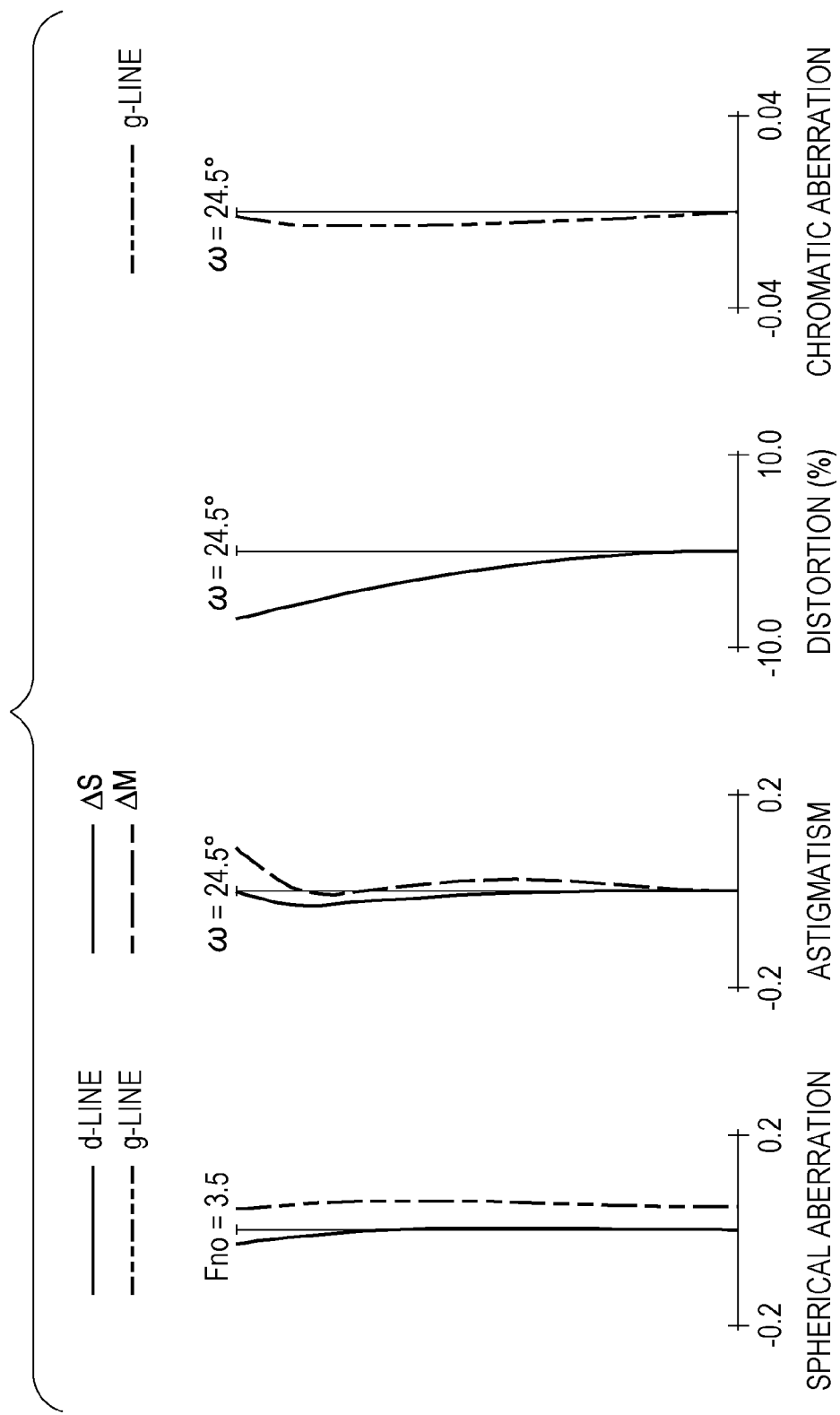

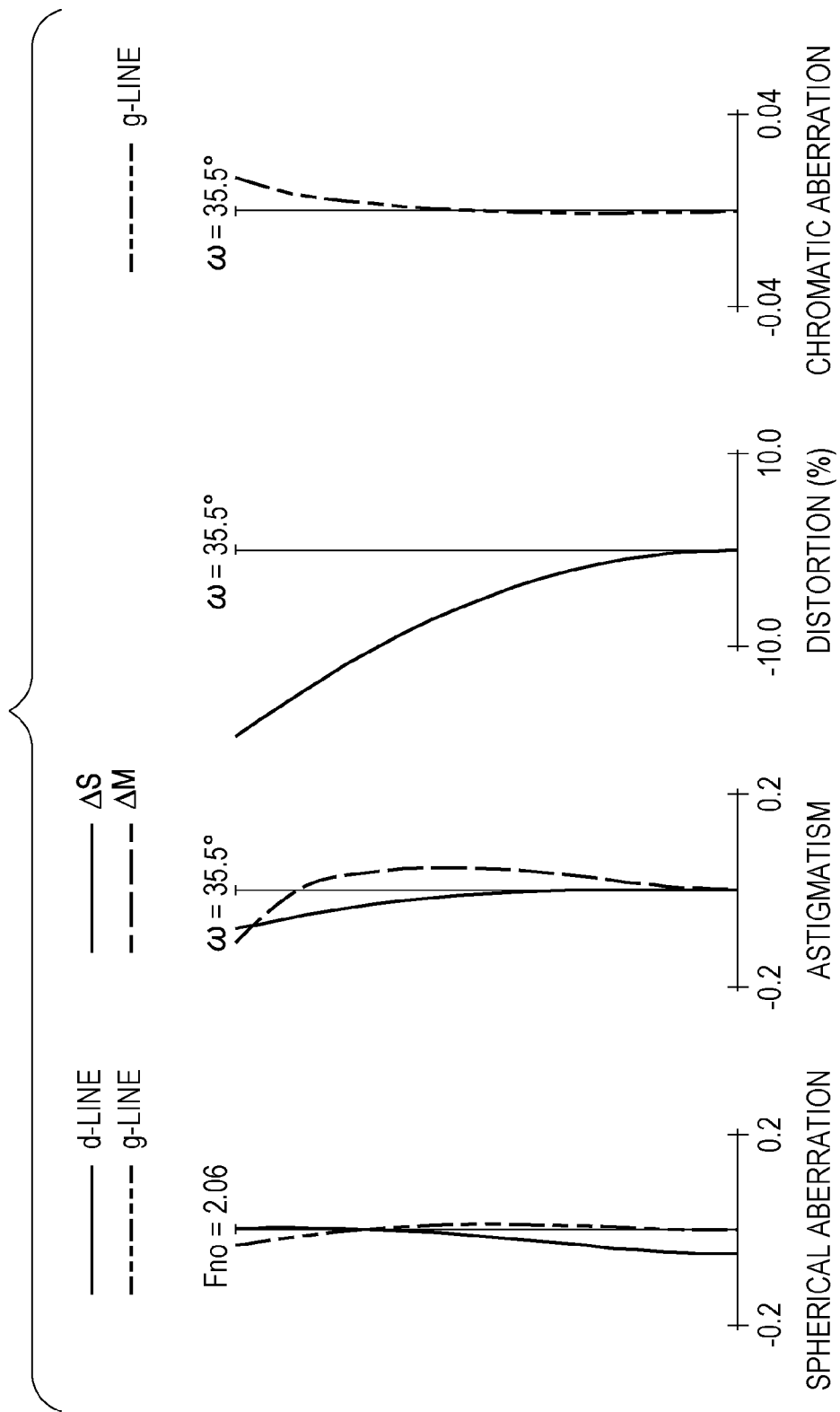

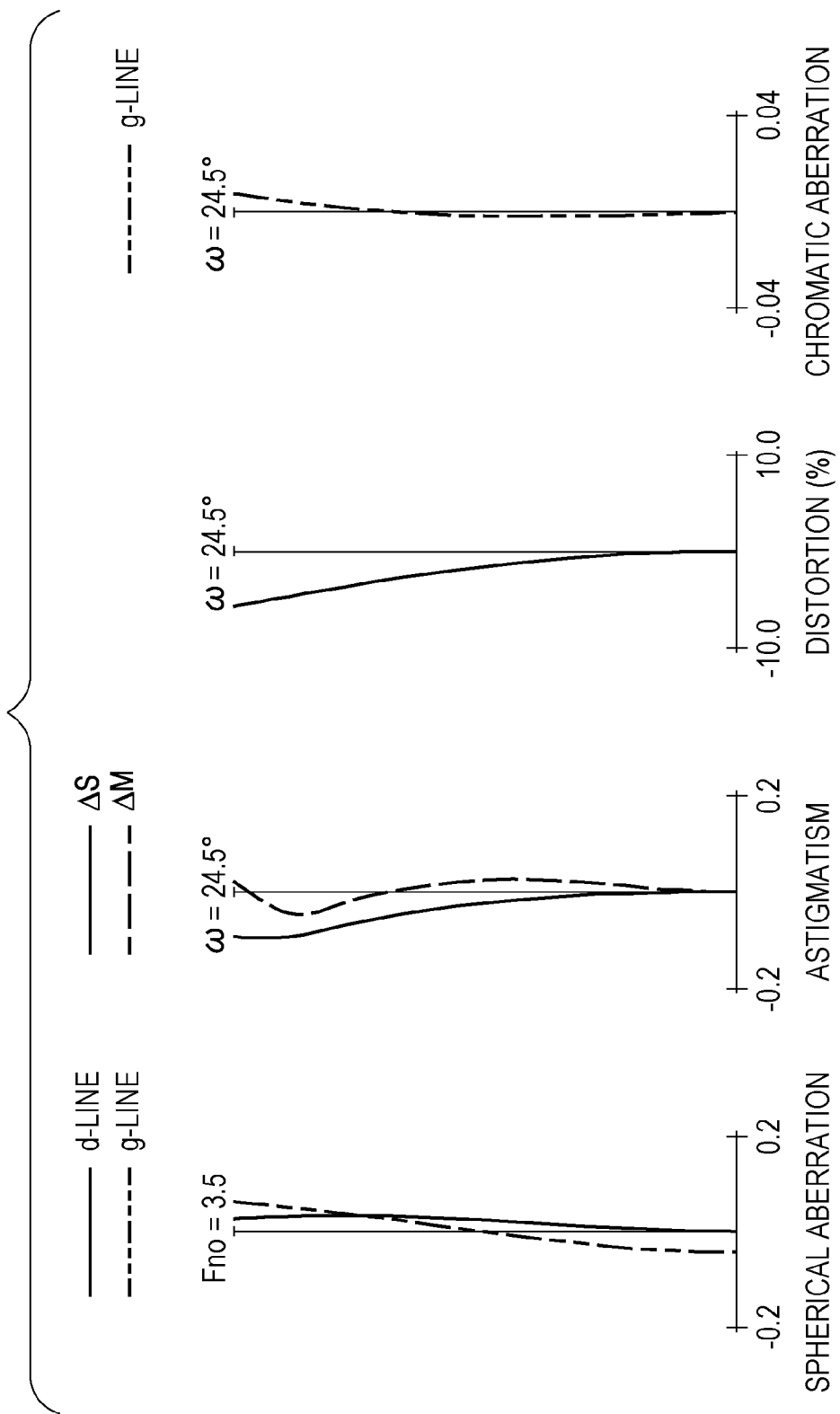

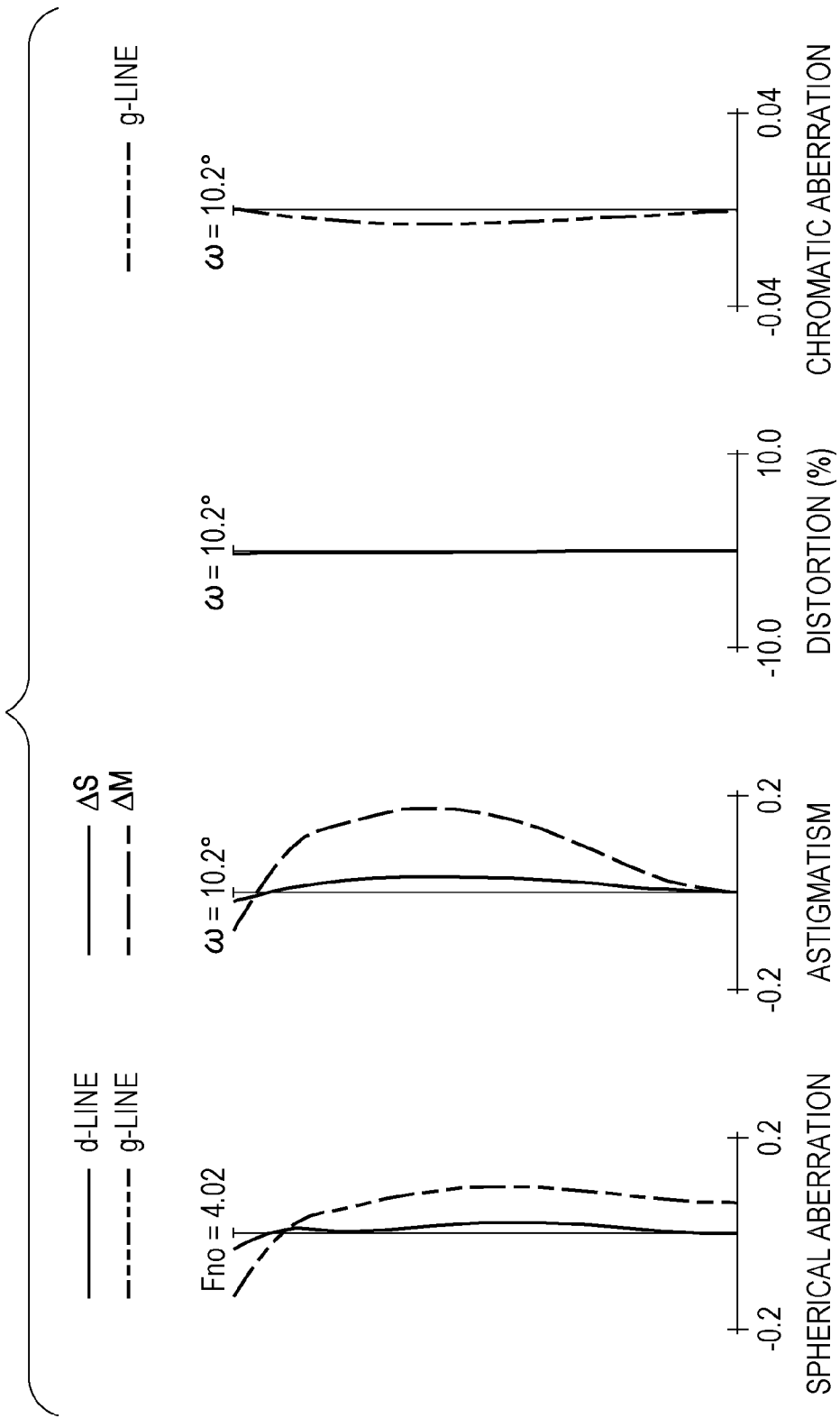

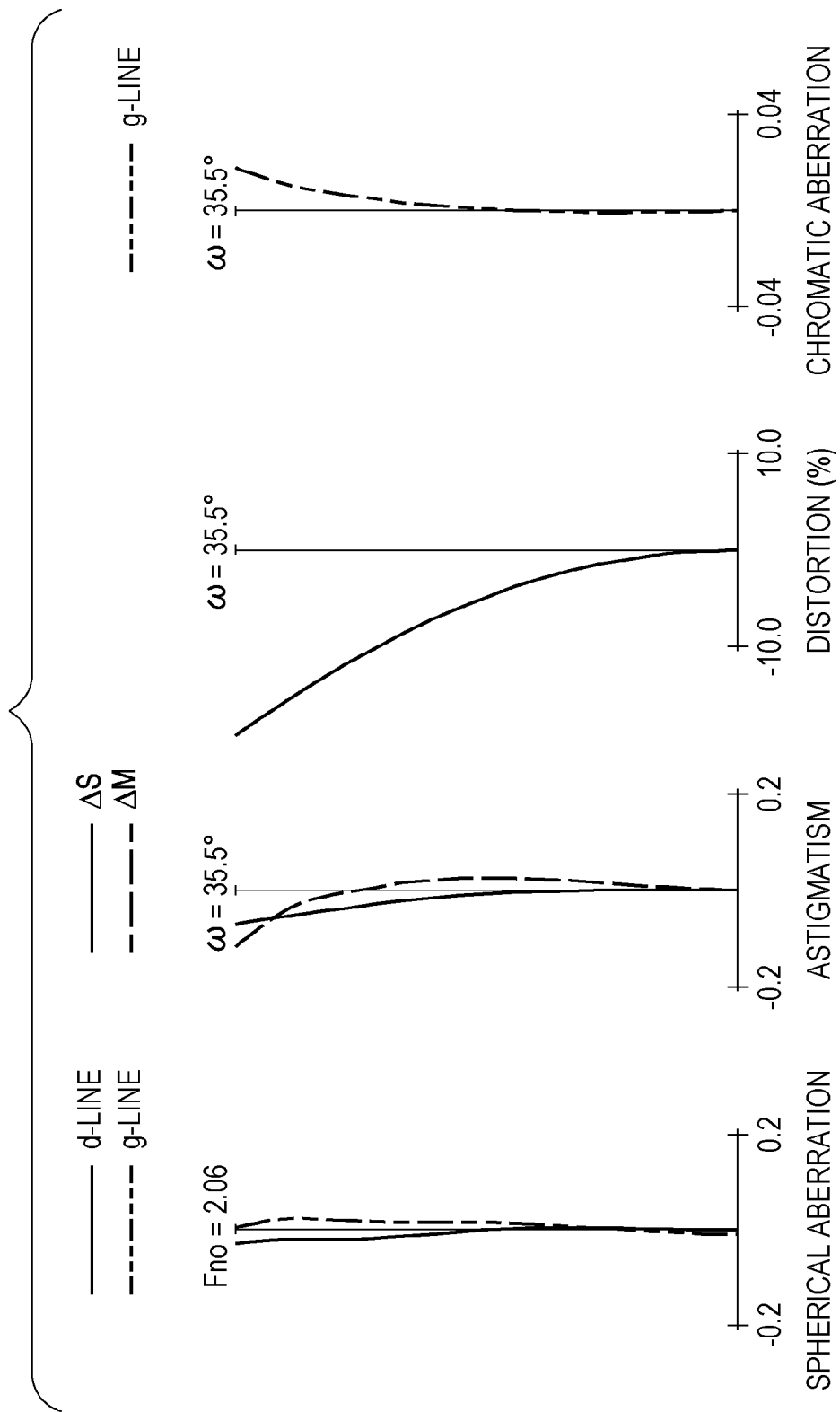

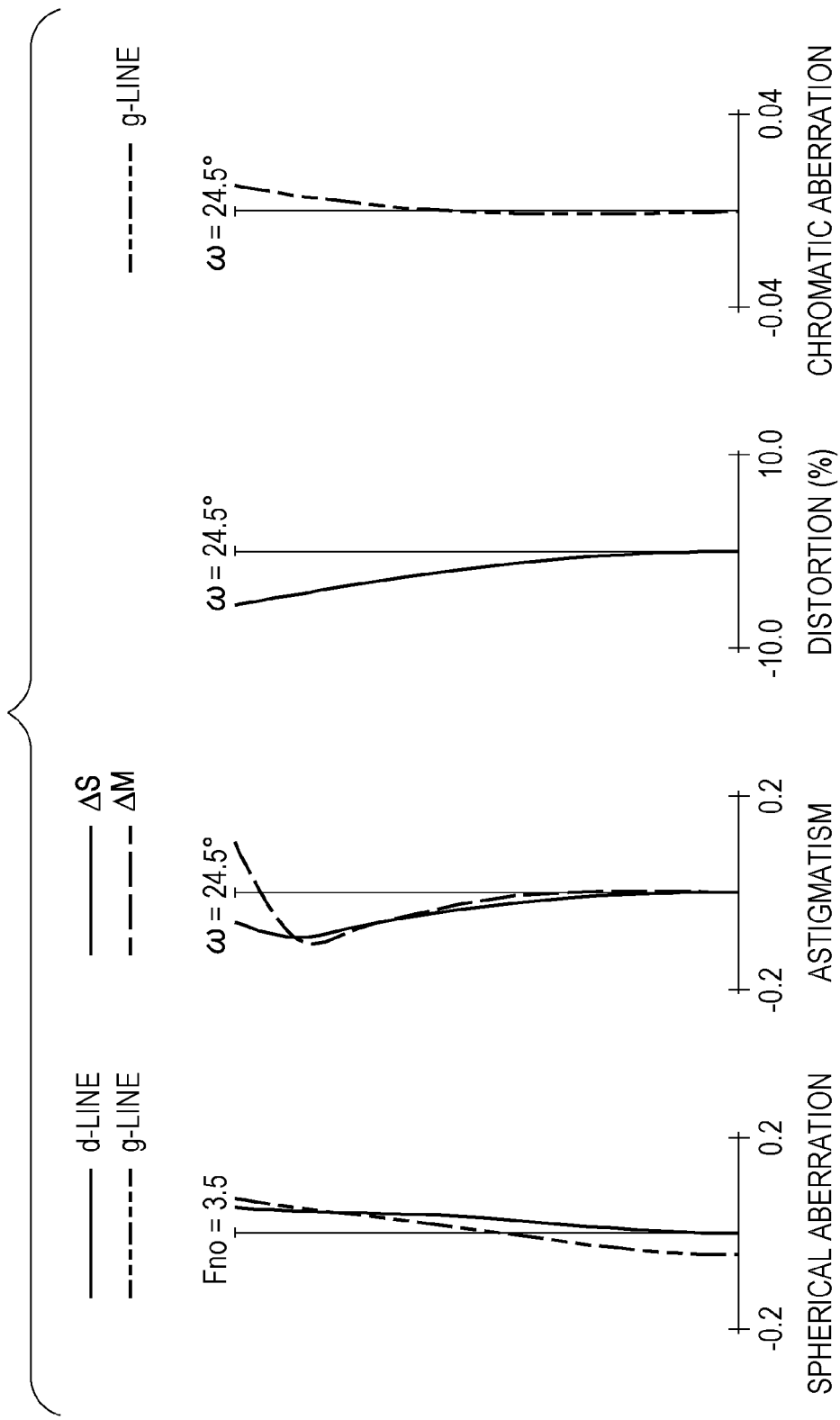

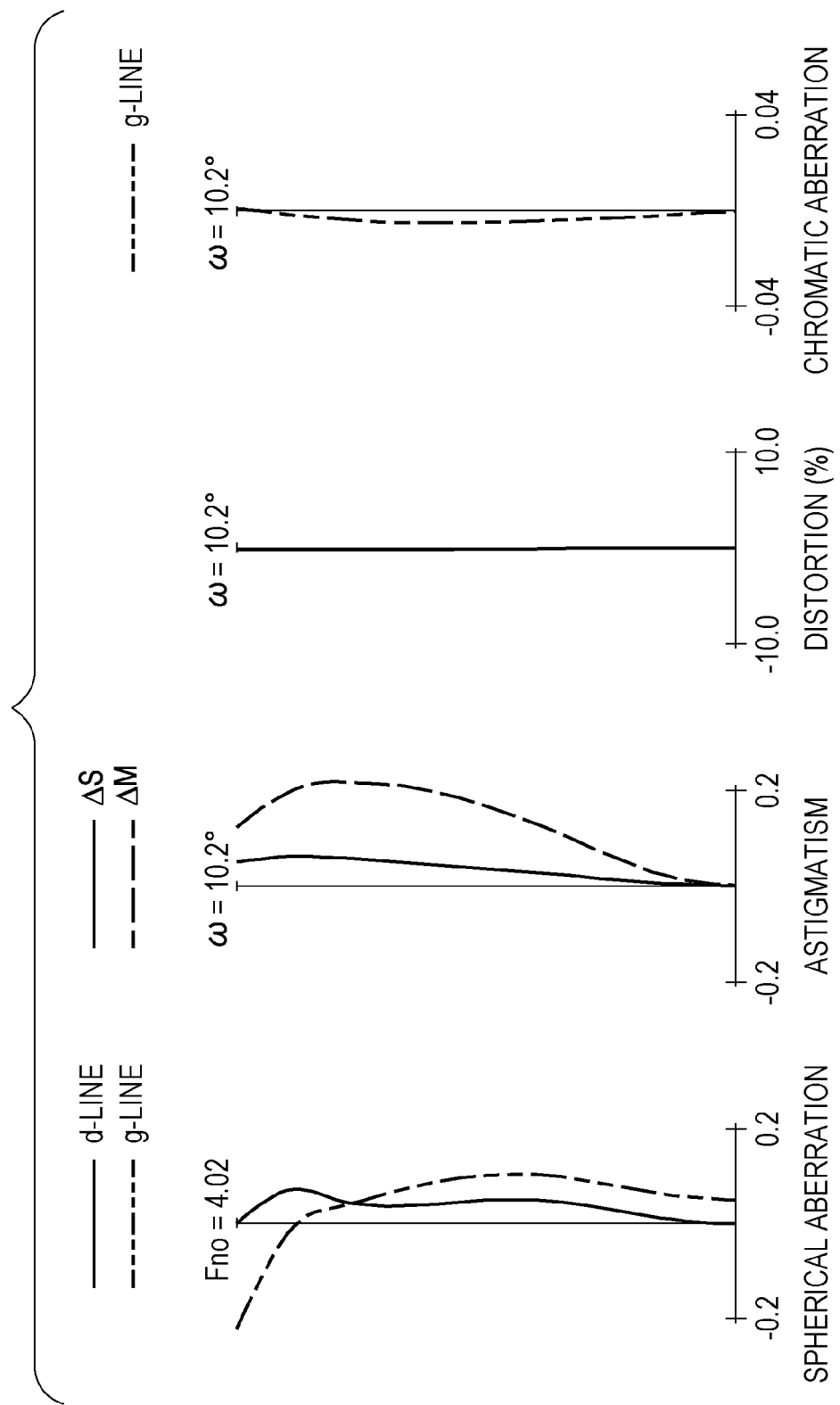

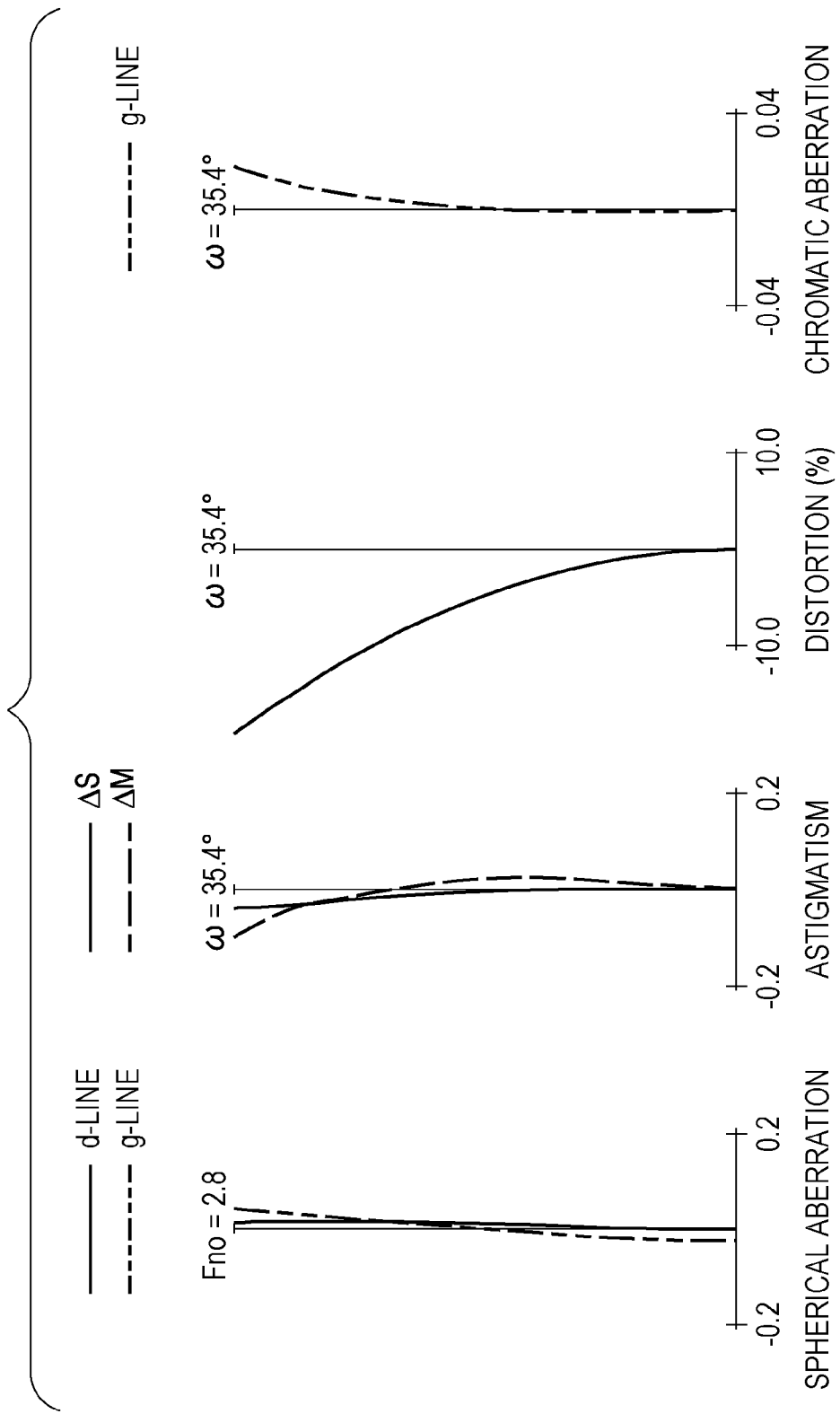

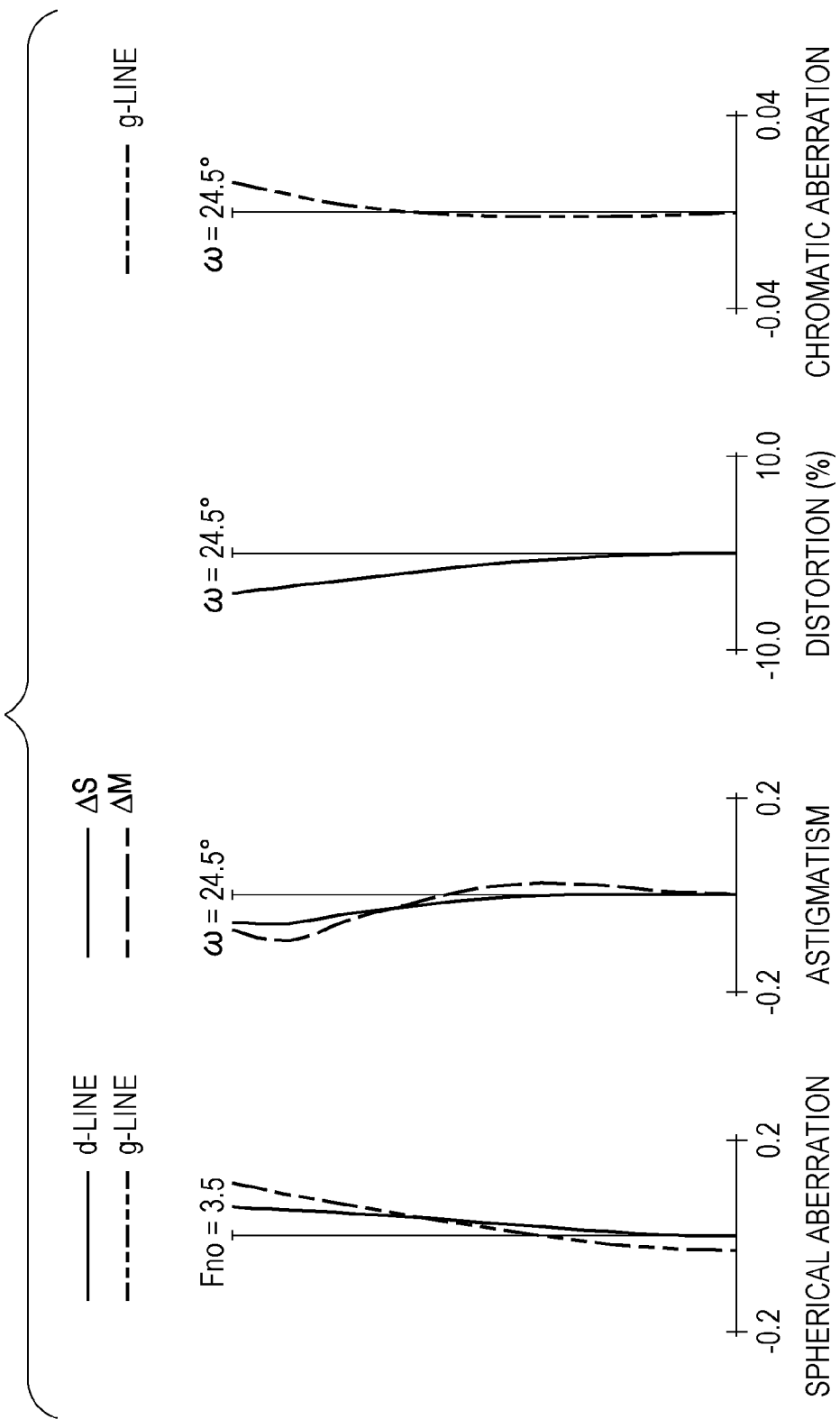

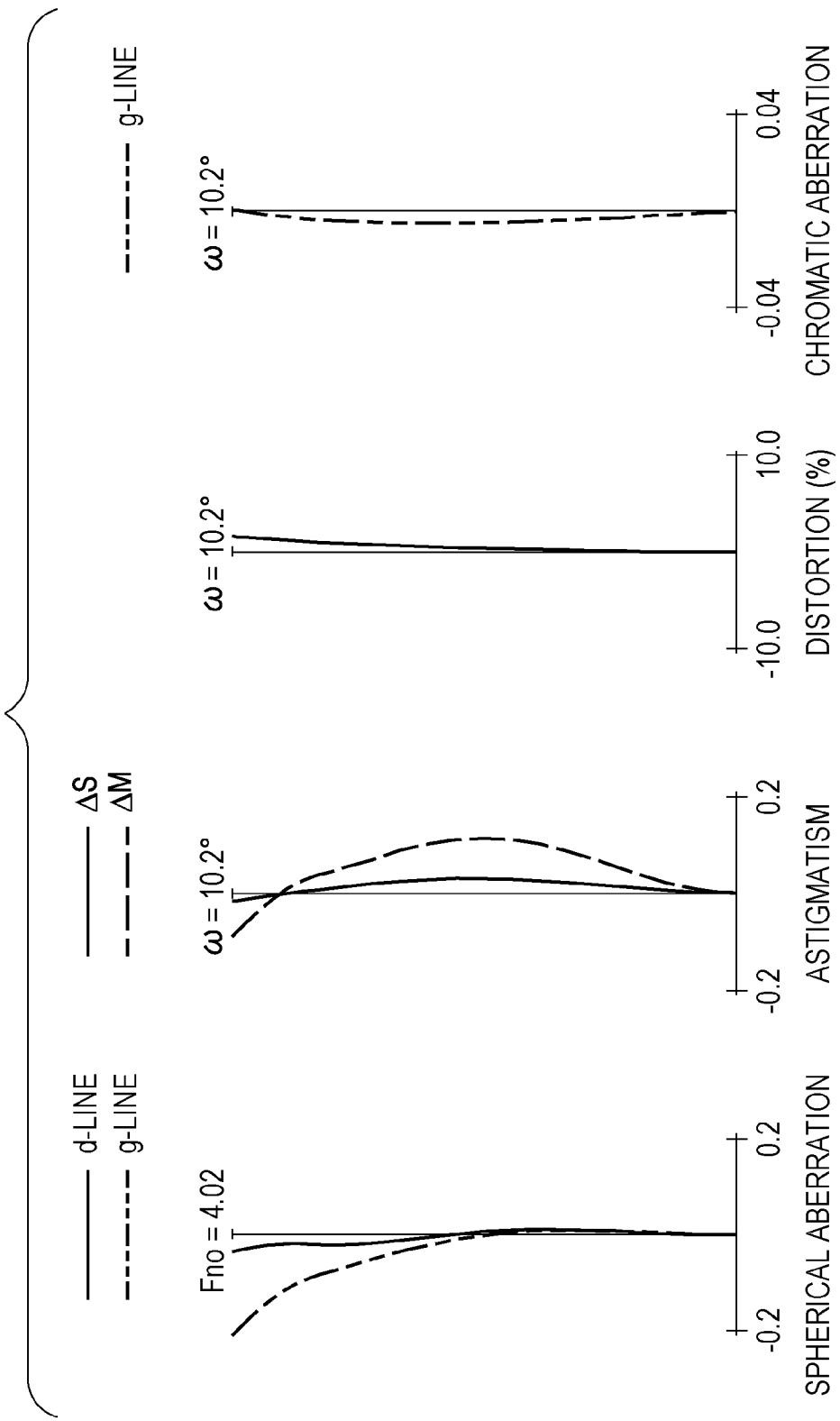

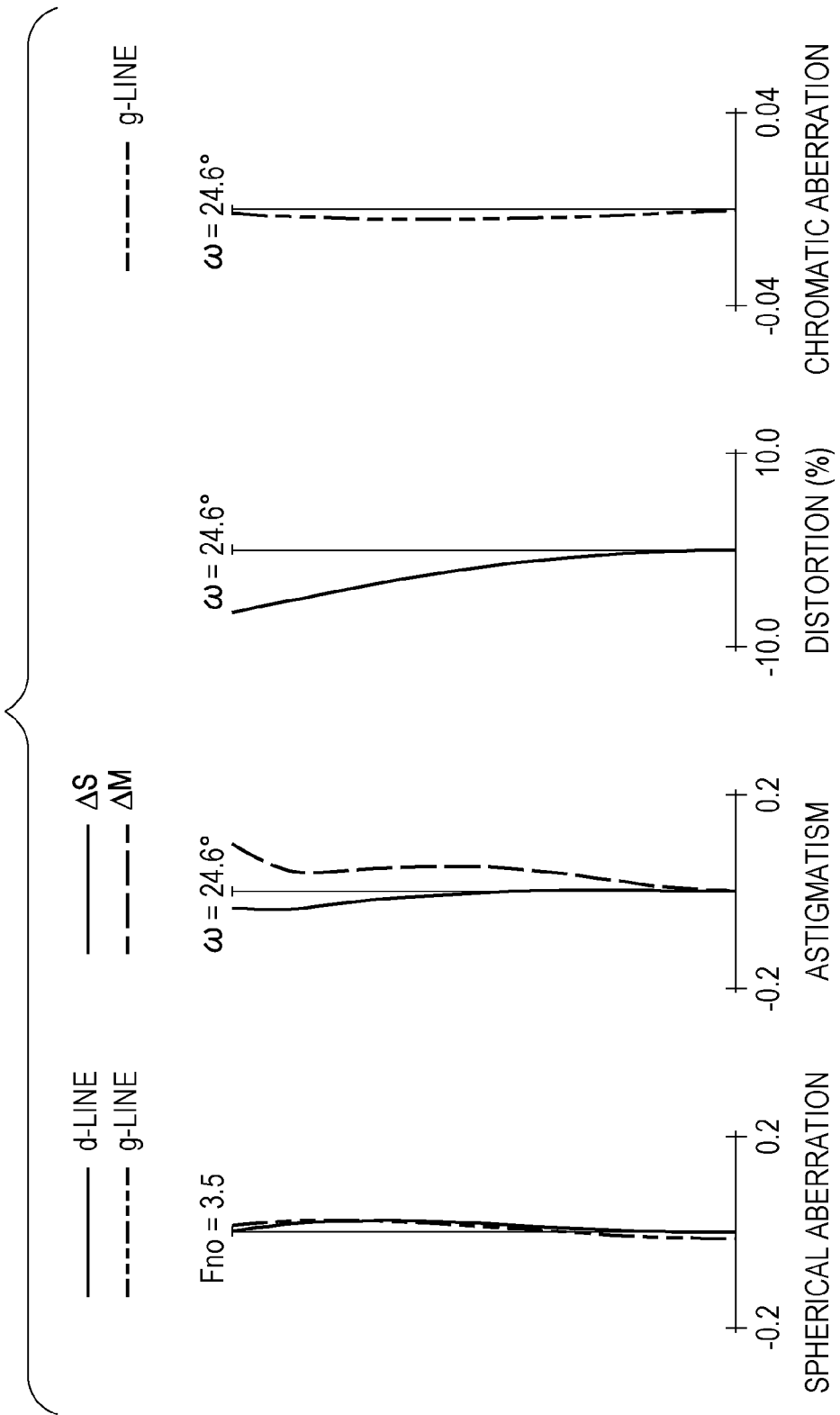

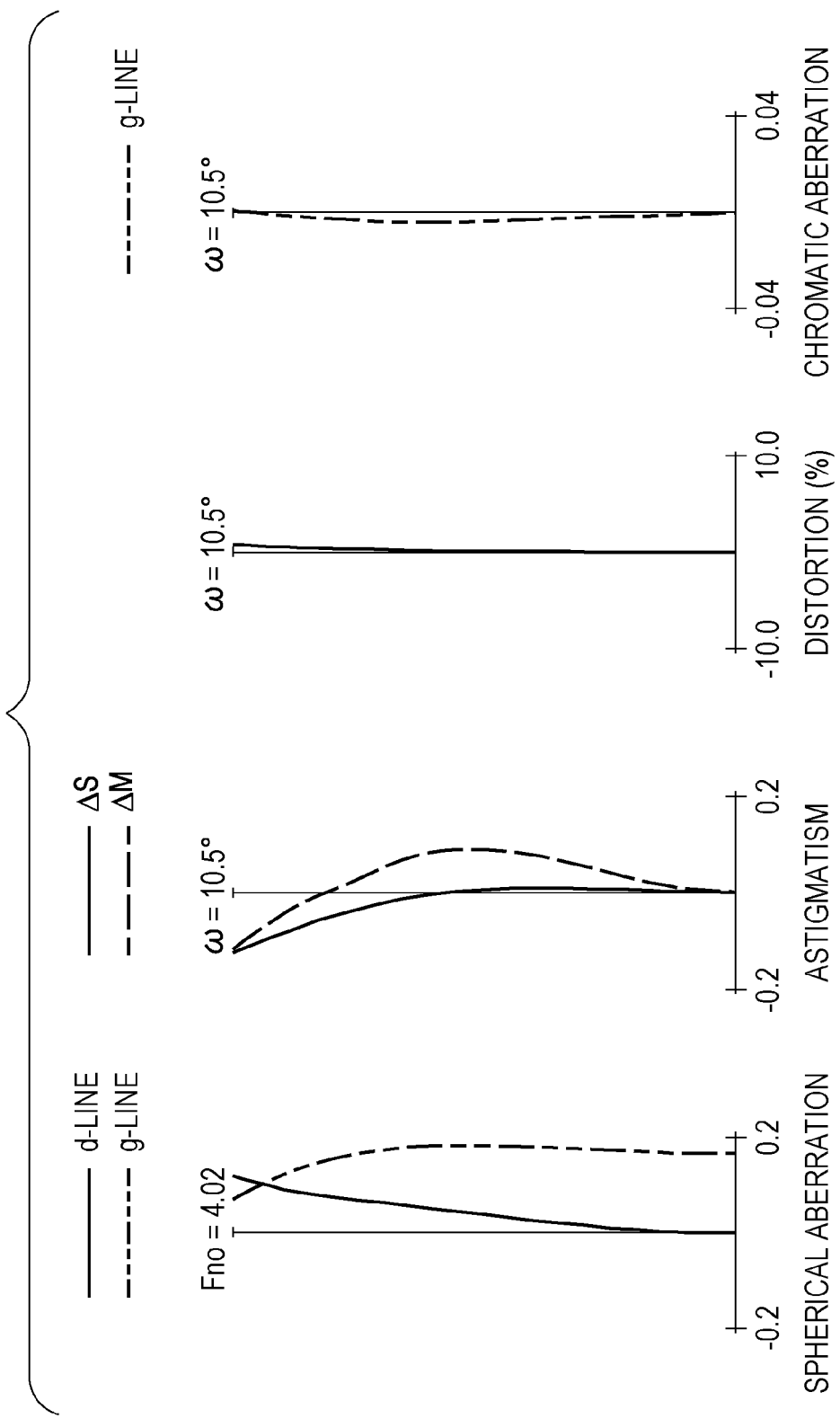

ZOOM LENS AND IMAGE PICKUP APPARATUS INCLUDING THE SAME

BACKGROUND OF THE INVENTION

1. Field of the Invention

The present inventions relate to at least one zoom lens and at least one image pickup apparatus including the same. The present inventions are suitable for image pickup apparatuses that use an image sensor, such as, but not limited to, a digital still camera, a video camera, a monitoring camera, and a broadcasting camera, and an image pickup apparatus, such as a camera that uses silver-halide film.

2. Description of the Related Art

Image pickup apparatuses that use a solid-state image sensor, such as a digital still camera and a video camera, have recently increased in performance and decreased in size. Thus, zoom lenses for use in such apparatuses are required to have a small overall lens length and a large aperture.

Japanese Patent Laid-Open No. 2012-47814 discloses a zoom lens including, in order from an object side to an image side, a first lens unit having positive refractive power, a second lens unit having negative refractive power, a third lens unit having positive refractive power, a fourth lens unit having positive refractive power, and a fifth lens unit having negative refractive power.

The zoom lens disclosed in Japanese Patent Laid-Open No. 2012-47814 has an aperture stop between the third lens unit and the fourth lens unit.

To obtain a high-resolution image-pickup optical system, it is generally important to appropriately set the configuration of lens elements disposed at the object side with respect to the aperture stop and the configuration of lens elements disposed at the image side with respect to the aperture stop in the image-pickup optical system. Inappropriate configurations thereof will make it difficult to obtain a large-aperture zoom lens in which an increase in the effective diameter of a front lens and an increase in the diameter of an aperture stop are reduced. In particular, excessively strong refractive power of a second lens unit makes it difficult to reduce the occurrence of field curvature in all zoom ranges.

SUMMARY OF THE INVENTION

According to various embodiments of the present inventions, at least one zoom lens includes, in order from an object side of the zoom lens to an image side of the zoom lens: a first lens unit having positive refractive power; a second lens unit having negative refractive power; a third lens unit having positive refractive power; an aperture stop; a fourth lens unit having positive refractive power; and a fifth lens unit having negative refractive power. In the at least one zoom lens, a distance between adjacent lens units of the zoom lens (e.g., one or more respective distances between adjacent lens units, distances between a plurality of lens units in the zoom lens, one or more respective distances between adjacent lens unit pairs among the plurality of the lens units in the zoom lens, etc.) changes during zooming. The third lens unit includes at least one positive lens and further includes at least one negative lens at the image side with respect to the positive lens. In at least one zoom lens, the following conditions are satisfied;

$$-4.00 < f2/fa < -0.26$$

$$-5.00 < f5/fb < -0.27$$

where f2 is a focal length of the second lens unit, f5 is a focal length of the fifth lens unit, fa is a combined focal length of lenses disposed at the object side with respect to the aperture stop (e.g., on the object side relative to the aperture stop, on the object side of the aperture stop, etc.) at a wide-angle end, and fb is a combined focal length of lenses disposed at the image side with respect to the aperture stop (e.g., on the image side relative to the aperture stop, on the image side of the aperture stop, tec.) at the wide-angle end. According to other aspects of the present inventions, other zoom lenses and image pickup apparatuses for use with the same are discussed herein.

Further features of the present inventions will become apparent from the following description of exemplary embodiments with reference to the attached drawings.

BRIEF DESCRIPTION OF THE DRAWINGS

FIG. 1 is a cross-sectional view of a zoom lens at a wide-angle end according to a first embodiment of the present inventions.

FIG. 2A is an aberration diagram of the zoom lens at the wide-angle end according to the first embodiment.

FIG. 2B is an aberration diagram of the zoom lens at an intermediate zooming position according to the first embodiment.

FIG. 4A is an aberration diagram of the zoom lens at the wide-angle end according to the second embodiment.

FIG. 4B is an aberration diagram of the zoom lens at the intermediate zooming position according to the second embodiment.

FIG. 4C is an aberration diagram of the zoom lens at the telephoto end according to the second embodiment.

FIG. 6A is an aberration diagram of the zoom lens at the wide-angle end according to the third embodiment.

FIG. 6B is an aberration diagram of the zoom lens at the intermediate zooming position according to the third embodiment.

FIG. 6C is an aberration diagram of the zoom lens at the telephoto end according to the third embodiment.

FIG. 8A is an aberration diagram of the zoom lens at the wide-angle end according to the fourth embodiment.

FIG. 8B is an aberration diagram of the zoom lens at the intermediate zooming position according to the fourth embodiment.

FIG. 8C is an aberration diagram of the zoom lens at the telephoto end according to the fourth embodiment.

FIG. 10B is an aberration diagram of the zoom lens at the intermediate zooming position according to the fifth embodiment.

FIG. 10C is an aberration diagram of the zoom lens at the telephoto end according to the fifth embodiment.

DESCRIPTION OF THE EMBODIMENTS

Zoom lenses and image pickup apparatuses including the same in some embodiments of the present invention will now be described in detail with reference to the drawings. A zoom lens in some embodiments of the present invention includes, from an object side to an image side, a first lens unit having positive refractive power, a second lens unit having negative refractive power, a third lens unit having positive refractive power, an aperture stop, a fourth lens unit having positive refractive power, and a fifth lens unit having negative refractive power. The lens units may each have one or more lenses and may not necessarily have a plurality of lenses. During zooming, the distance between adjacent lens units changes.

Figure 2C:
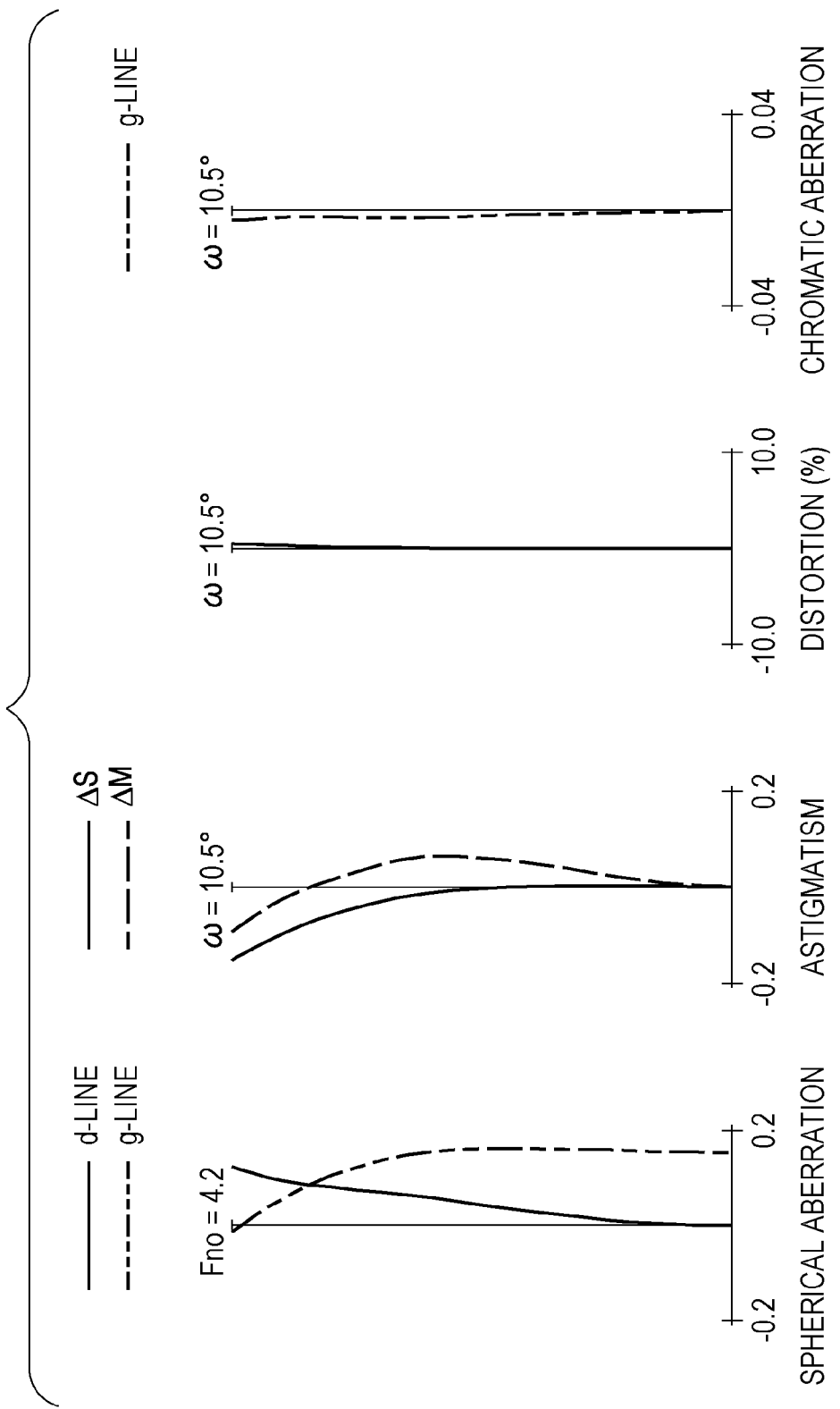
FIG. 2C is an aberration diagram of the zoom lens at a telephoto end according to the first embodiment.
Figure 3:
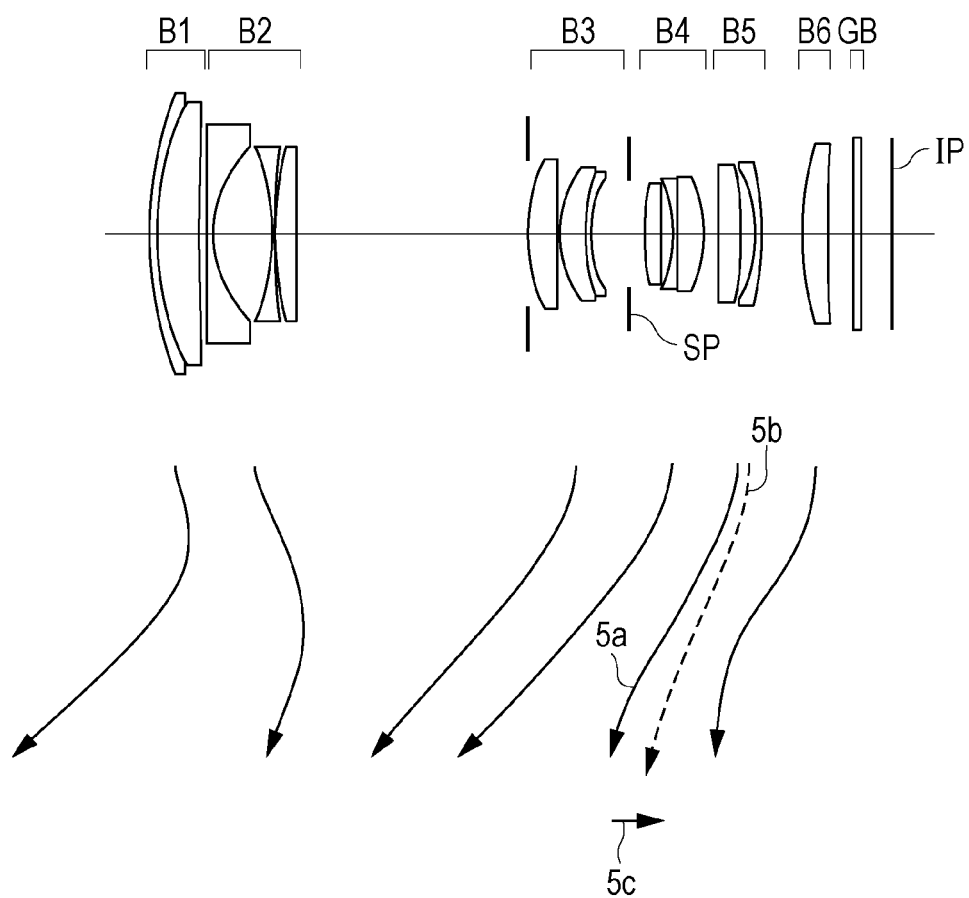
FIG. 3 is a cross-sectional view of a zoom lens at the wide-angle end according to a second embodiment of the present inventions.

FIG. 1 is a cross-sectional view of a zoom lens at a wide-angle end according to a first embodiment of the present invention. FIGS. 2A, 2B, and 2C are aberration diagrams of the zoom lens of the first embodiment at the wide-angle end, an intermediate zooming position, and a telephoto end, respectively. The first embodiment is a zoom lens having a zoom ratio of 4.73 and an aperture ratio or about 2.06 to 4.20. FIG. 3 is a cross-sectional view of a zoom lens at the wide-angle end according to a second embodiment of the present invention. FIGS. 4A, 4B, 4C are aberration diagrams of the zoom lens of the second embodiment at the wide-angle end, the intermediate zooming position, and the telephoto end, respectively. The second embodiment is a zoom lens having a zoom ratio of 4.89 and an aperture ratio of about 2.06 to 4.02.

Figure 5:
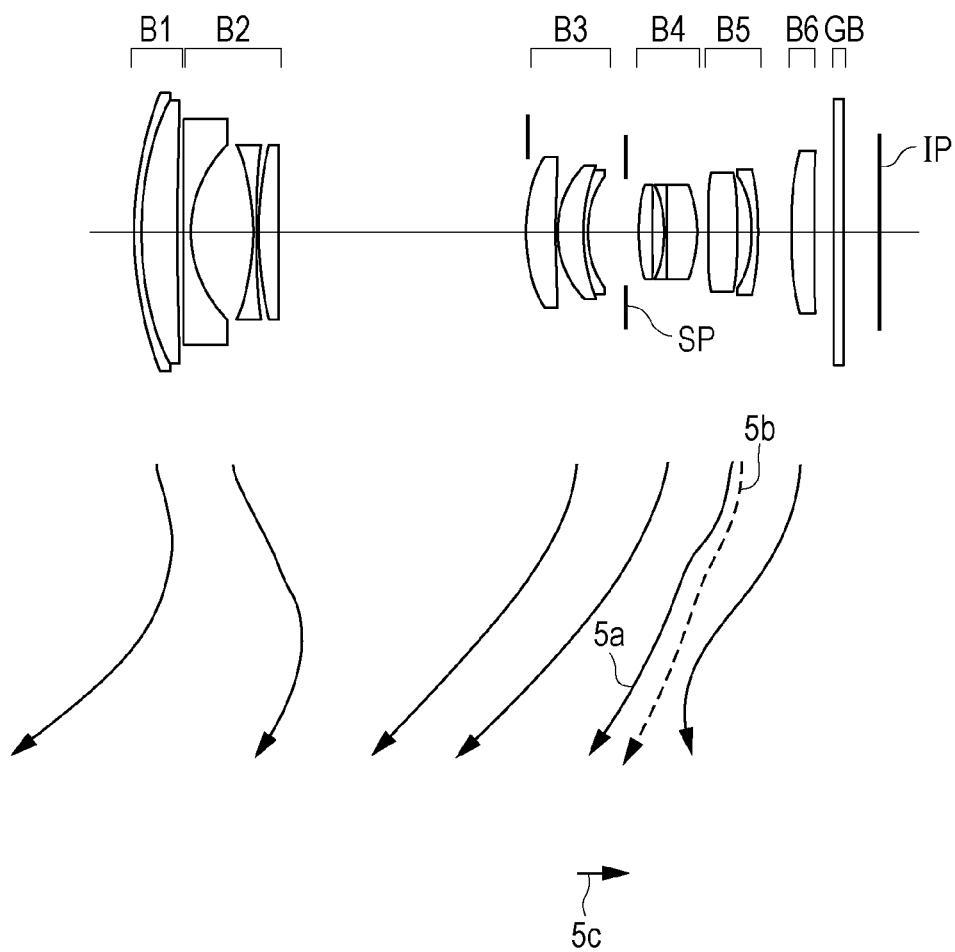
FIG. 5 is a cross-sectional view of a zoom lens at the wide-angle end according to a third embodiment of the present inventions.
Figure 7:
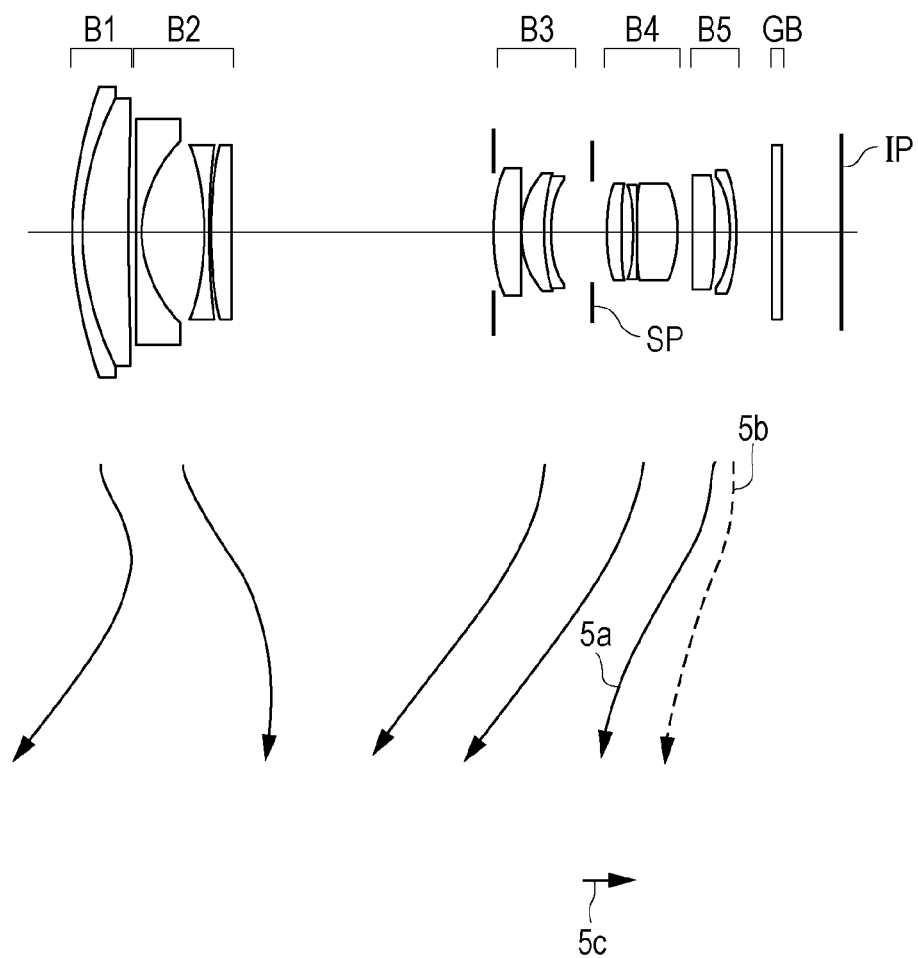
FIG. 7 is a cross-sectional view of a zoom lens at the wide-angle end according to a fourth embodiment of the present inventions.

FIG. 5 is a cross-sectional view of a zoom lens at the wide-angle end according to a third embodiment of the present invention. FIGS. 6A, 6B, and 6C are aberration diagrams of the zoom lens of the third embodiment at the wide-angle end, the intermediate zooming position, and the telephoto end, respectively. The third embodiment is a zoom lens having a zoom ratio of 4.87 and an aperture ratio of about 2.06 to 4.02. FIG. 7 is a cross-sectional view of a zoom lens at the wide-angle end according to a fourth embodiment of the present invention. FIGS. 8A, 8B, and 8C are aberration diagrams of the zoom lens of the fourth embodiment at the wide-angle end, the intermediate zooming position, and the telephoto end, respectively. The fourth embodiment is a zoom lens having a zoom ratio of 4.86 and an aperture ratio of about 2.80 to 4.02.

Figure 9:
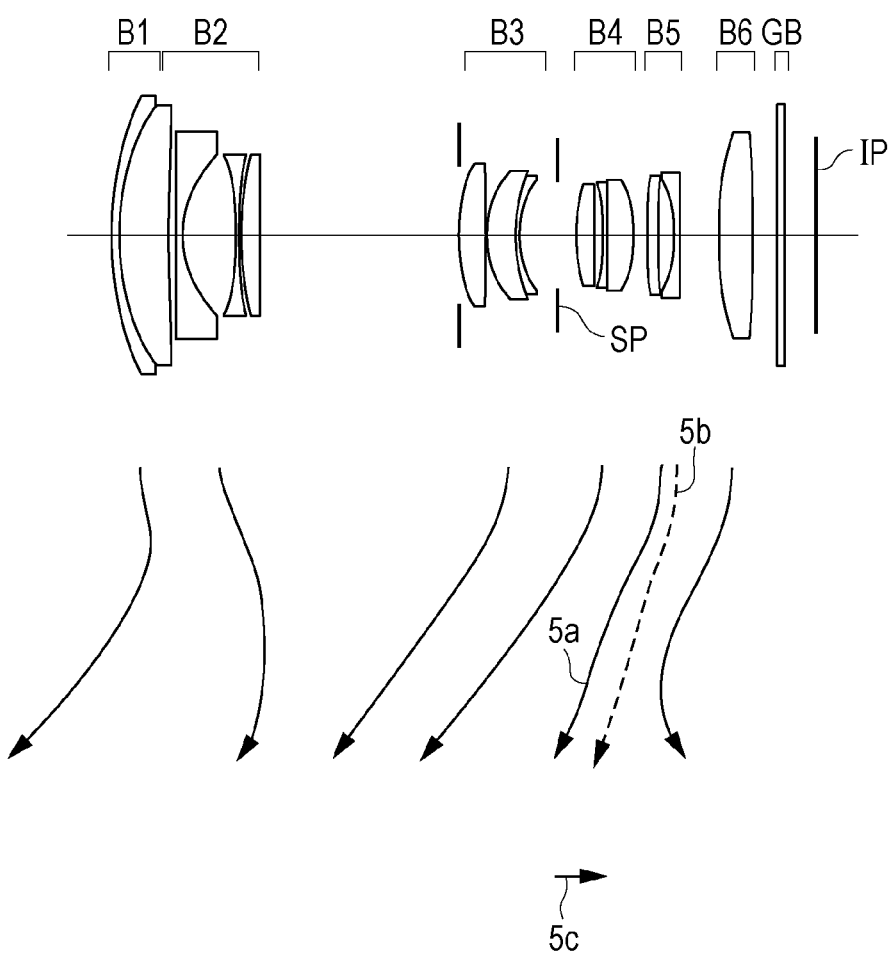
FIG. 9 is a cross-sectional view of a zoom lens at the wide-angle end according to a fifth embodiment of the present inventions.
Figure 10A:
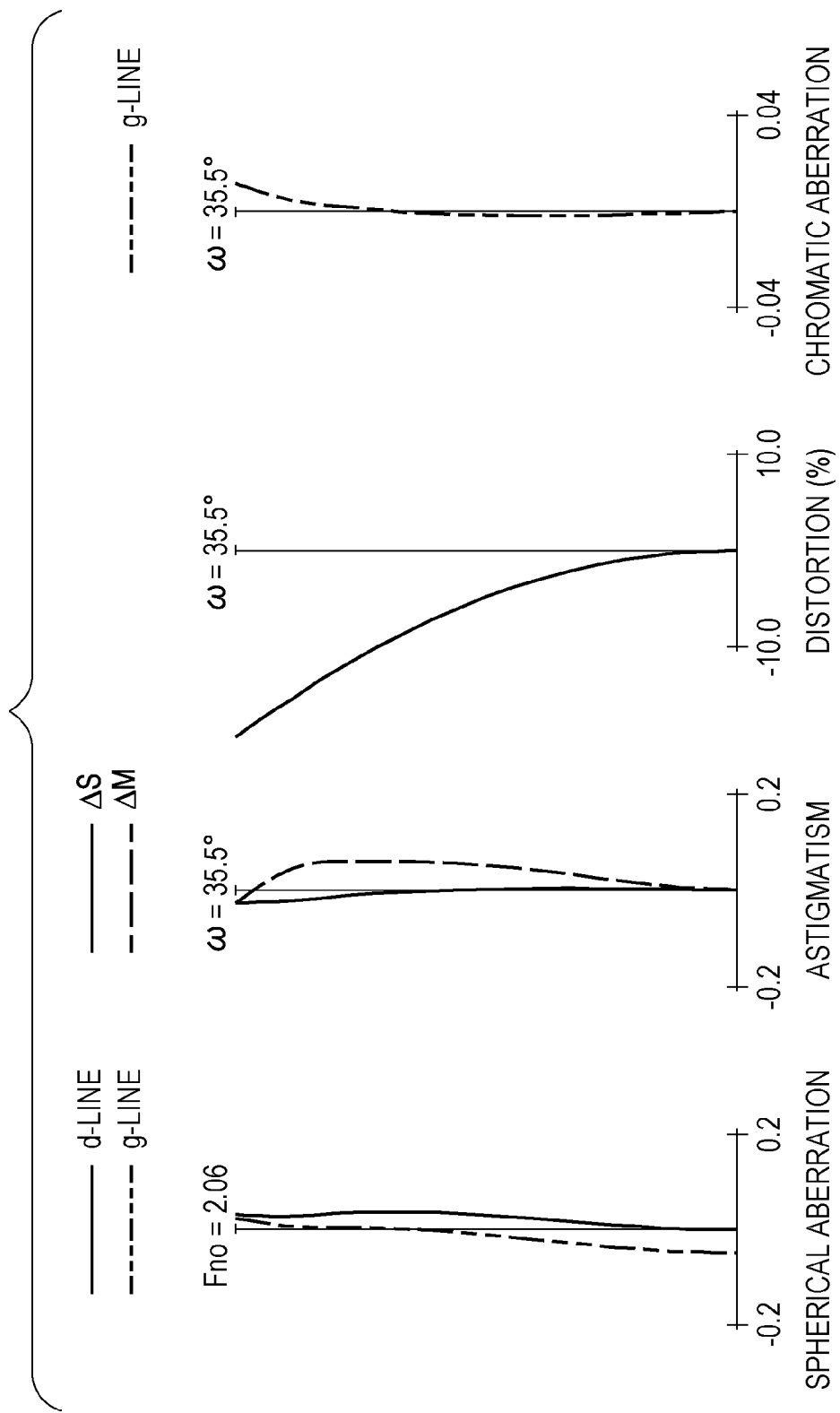
FIG. 10A is an aberration diagram of the zoom lens at the wide-angle end according to the fifth embodiment.

FIG. 9 is a cross-sectional view of a zoom lens at the wide-angle end according to a fifth embodiment of the present invention. FIGS. 10A, 10B, and 10C are aberration diagrams of the zoom lens of the fifth embodiment at the wide-angle end, the intermediate zooming position, and the telephoto end, respectively. The fifth embodiment is a zoom lens having a zoom ratio of 4.72 and an aperture ratio of about 2.06 to 4.02.

Figure 11:
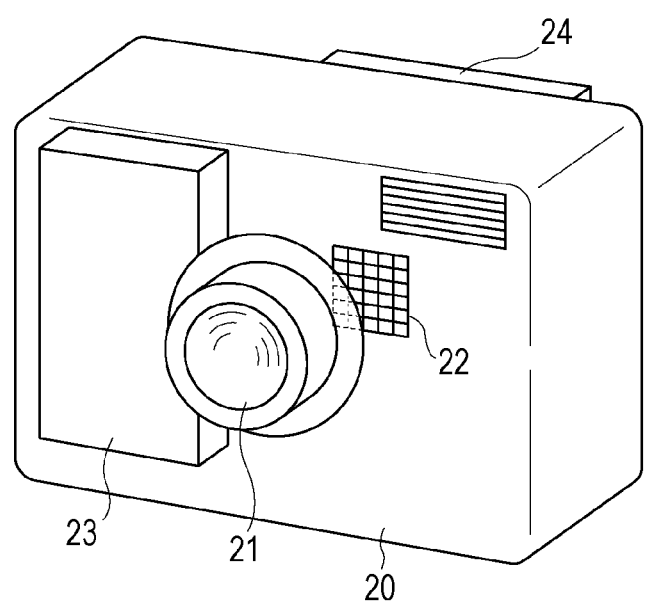
FIG. 11 is a schematic diagram of an exemplary image pickup apparatus according to at least one embodiment of the present inventions.

FIG. 11 is a schematic diagram of a relevant part of a digital still camera (an image pickup apparatus) including a zoom lens of an embodiment of the present invention. Zoom lenses according to some embodiments are image-taking lenses for use in image pickup apparatuses, such as a video camera, a digital still camera, a silver-halide film camera, and a TV camera. In the cross-sectional views, the left side (e.g., of the views, of the zoom lens(es), etc.) is the object side (front), and the right side (e.g., of the views, of the zoom lens(es), etc.) is the image side (rear) of the zoom lenses. In the cross-sectional views, Bi denotes an i-th lens unit, where i denotes the order of the lens unit from the object side to the image side.

The zoom lenses of the first to third embodiments and the fifth embodiments are positive-lead type six-unit zoom lenses each including and/or consisting of six lens units. The zoom lenses of the first to third embodiments and the fifth embodiments each including and/or consisting of, in order from the object side to the image side, a first lens unit B1 having positive refractive power, a second lens unit B2 having negative refractive power, a third lens unit B3 having positive refractive power, a fourth lens unit B4 having positive refractive power, a fifth lens unit B5 having negative refractive power, and a sixth lens unit B6 having positive refractive power. The zoom lens of the fourth embodiment is a positive-lead type five-unit zoom lens including and/or consisting of five lens units. The zoom lens of the fourth embodiment includes and/or consists of, in order from the object side to the image side, a first lens unit B1 having positive refractive power, a second lens unit B2 having negative refractive power, a third lens unit B3 having positive refractive power, a fourth lens unit B4 having positive refractive power, and a fifth lens unit B5 having negative refractive power.

In the embodiments, reference sign SP denotes an aperture stop, which is disposed between the third lens unit B3 and the fourth lens unit B4. Since this allows the position of an entrance pupil to be moved toward the object side as compared with a case in which the aperture stop is disposed at the image side with respect to the fourth lens unit B4, a wide angle of view can be achieved without increasing the effective diameter of the front lens. Disposing the aperture stop at the object side with respect to the third lens unit B3 disadvantageously increases the diameter of the aperture stop SP.

In the embodiments, the third lens unit B3 includes at least one positive lens and at least one negative lens at the image side with respect to the positive lens. Since the third lens unit B3 includes a negative lens, the refractive power of the positive lens included in the third lens unit B3 can be higher than that of a configuration in which the third lens unit B3 includes and/or consists of only positive lenses. Since this allows the position of the principal point of the third lens unit B3 to be moved to the object side, an increase in the diameter of the front lens at the wide-angle end can be reduced while a large aperture is achieved.

Reference sign GB denotes an optical block corresponding to an optical filter, a face plate, a low-pass filter, an infrared cut filter, or the like. Reference sign IP denotes an image plane. When the zoom lens is used as an image-pickup optical system of a video camera or a digital camera, the image plane IP corresponds to a solid-state image sensor (a photoelectric conversion element), such as a CCD sensor or a CMOS sensor. When the zoom lens is used as an image-pickup optical system of a silver-halide film camera, the image plane IP corresponds to a film surface.

In the spherical aberration diagrams, Fno denotes F-number, which indicates a spherical aberration for d-line (wavelength: 587.6 nm) and g-line (wavelength: 435.8 nm). In the astigmatism diagrams, $\Delta S$ denotes a sagittal image plane, and $\Delta M$ denotes a meridional image plane. The distortion is for the d-line. The magnification chromatic aberration diagrams show magnification chromatic aberrations for the g-line. Reference sign $\omega$ denotes a half angle of view for image capture.

In the embodiments, the individual lens units move during zooming from the wide-angle end toward the telephoto end. Arrows in the cross-sectional views of the lenses indicate the moving loci of the individual lens units during zooming from the wide-angle end toward the telephoto end.

Specifically, in the zoom lenses of the first to third embodiments and the fifth embodiment, the first lens unit B1 and the second lens unit B2 move in a locus convex to the image side during zooming from the wide-angle end toward the telephoto end. The third to sixth lens units B3 to B6 move toward the object side during zooming from the wide-angle end toward the telephoto end.

In the zoom lens of the fourth embodiment, the first lens unit B1 moves in a locus convex to the image side during zooming from the wide-angle end toward the telephoto end. The second lens unit B2 moves toward the image side during zooming from the wide-angle end toward the telephoto end. The third to fifth lens units B3 to B5 move toward the object side during zooming from the wide-angle end toward the telephoto end.

In the zoom lenses of the embodiments, the fifth lens unit B5 is used as a focus lens unit. For focusing from an object at infinity to a nearby object at the telephoto end, the fifth lens unit B5 is moved toward the image side, as indicated by an arrow 5c in the cross-sectional views. A solid line 5a and a dotted line 5b in the cross-sectional views show moving loci for correcting fluctuations in the image plane due to zooming from the wide-angle end toward the telephoto end during focusing to an object at infinity and a nearby object, respectively.

In the embodiments, performing focusing by moving the fifth lens unit B5 having relatively strong refractive power can decrease the amount of movement of the focus lens unit when focusing from an object at infinity to a nearby object. This can decrease the overall lens length.

In the embodiments, the following conditions are satisfied:

$$4.00 < f2/fa < -0.26 \quad (1)$$

$$5.00 < f5/fb < -0.27 \quad (2)$$

where f2 is the focal length of the second lens unit B2, f5 is the focal length of the fifth lens unit B5, fa is a combined focal length of the lenses disposed at the object side with respect to the aperture stop SP at the wide-angle end, and fb is a combined focal length of the lenses disposed at the image side with respect to the aperture stop SP at the wide-angle end If the combined focal length fa of lenses disposed at the object side with respect to the aperture stop SP at the wide-angle end increases beyond the upper limit of condition (1), the position of the entrance pupil moves toward the image side to achieve a large aperture. This disadvantageously increases the effective diameter of the front lens.

If the combined focal length fa of the lenses disposed at the object side with respect to the aperture stop SP at the wide-angle end decreases beyond the lower limit of condition (1), the position of the entrance pupil moves toward the object side. This disadvantageously increases the aperture diameter to achieve a large aperture.

If f5/fb exceeds the upper limit of condition (2), the combined focal length fb of lenses disposed at the image side with respect to the aperture stop SP at the wide-angle end increases. This disadvantageously increases the overall lens length at the wide-angle end.

If f5/fb exceeds the lower limit of condition (2), the combined focal length fb of the lenses disposed at the image side with respect to the aperture stop SP at the wide-angle end decreases. This disadvantageously causes much shading, resulting in degradation in image quality.

In the above embodiments, the elements are suitably set so as to satisfy conditions (1) and (2). This allows a compact, large-aperture zoom lens having high optical performance in all zoom ranges to be provided.

In some embodiments, the numerical ranges of conditions (1) and (2) are preferably set as follows:

$$-2.00 < f2/fa < -0.29 \quad (1a)$$

$$-3.00 < f5/fb < -0.50 \quad (2a)$$

More preferably, the numerical ranges of conditions (1) and (2) are set as follows:

$$-0.96 < f2/fa < -0.30 \quad (1b)$$

$$-2.00 < f5/fb < -0.60 \quad (2b)$$

In some embodiment, more preferably, one or more of the following conditions are satisfied:

$$0.05 < M3/f3 < 2.00 \quad (3)$$

$$3.00 < f1/|f2| < 6.00 \quad (4)$$

$$2.00 < TDw/fw < 11.00 \quad (5)$$

$$0.05 < fa/fb < 3.00 \quad (6)$$

$$-4.00 < f4/f5 < -0.05 \quad (7)$$

where M3 is the amount of movement of the third lens unit B3 during zooming from the wide-angle end toward the telephoto end, f1 is the focal length of the first lens unit B1, f3 is the focal length of the third lens unit B3, and f4 is the focal length of the fourth lens unit B4, in which the amount of movement of the lens unit during zooming from the wide-angle end toward the telephoto end is a difference in position on the optical axis of the lens unit between the wide-angle end and the telephoto end, and the sign of the amount of movement is positive when the lens unit is located closer to the object side at the telephoto end than at the wide-angle end and is negative when the lens unit is located closer to the image side. TDw is the distance on the optical axis at the wide-angle end between an object-side surface of a lens closest to the object side of the first lens unit B1 and an image plane, and fw is the focal length of the entire system at the wide-angle end.

If the amount of movement M3 of the third lens unit B3 during zooming from the wide-angle end toward the telephoto end increases beyond the upper limit of condition (3), the overall lens length disadvantageously increases.

If the amount of movement M3 of the third lens unit B3 during zooming from the wide-angle end toward the telephoto end decreases beyond the lower limit of condition (3), the proportion of the magnification changing operation of the third lens unit B3 decreases, thus disadvantageously making it difficult to obtain a zoom lens having a high zoom ratio.

If the focal length of the second lens unit B2 decreases beyond the upper limit of condition (4), the refractive power of the second lens unit B2 increases, thus disadvantageously making it difficult to reduce the occurrence of magnification chromatic aberration and field curvature in all zoom ranges. If the focal length of the second lens unit B2 increases beyond the lower limit of condition (4), the refractive power of the second lens unit B2 decreases, disadvantageously resulting in an increase in the effective diameter of the front lens.

If TDw/fw exceeds the upper limit of condition (5), the overall lens length at the wide-angle end disadvantageously increases. If TDw/fw exceeds the lower limit of condition (5) to decrease the overall lens length at the wide-angle end, a need for increasing the refractive power of the individual lens units arises, thus disadvantageously making it difficult to reduce the occurrence of axial chromatic aberration and coma aberration in all zoom ranges.

If the combined focal length fa of the lenses disposed at the object side with respect to the aperture stop SP at the wide-angle end increases beyond the upper limit of condition (6), the position of the entrance pupil at the wide-angle end moves toward the image side, thus disadvantageously increasing the front lens diameter at the wide-angle end.

If the combined focal length fa of the lenses disposed at the object side with respect to the aperture stop SP at the wide-angle end decreases beyond the lower limit of condition (6), the position of the entrance pupil at the wide-angle end moves toward the object side, thus disadvantageously increasing the aperture diameter to achieve a large aperture diameter.

If the focal length of the fourth lens unit B4 decreases beyond the upper limit of condition (7), the refractive power of the fourth lens unit B4 becomes excessively strong, thus disadvantageously making it difficult to reduce the occurrence of coma aberration and spherical aberration at the wide-angle end.

If the focal length of the fourth lens unit B4 increases beyond the lower limit of condition (7), the refractive power of the fourth lens unit B4 becomes excessively low, thus disadvantageously increasing the overall lens length at the wide-angle end.

If the numerical ranges of conditions (3) to (7) are preferably set as follows, the advantages of conditions (3) to (7) can be maximized.

$$0.30 < M3/f3 < 1.50 \quad (3a)$$

$$3.50 < f1/|f2| < 5.50 \quad (4a)$$

$$4.00 < TDw/fw < 9.00 \quad (5a)$$

$$0.10 < fa/fb < 2.50 \quad (6a)$$

$$-2.00 < f4/f5 < -0.20 \quad (7a)$$

More preferably, the numerical ranges of conditions (3) to (7) may be set as follows:

$$0.60 < M3/f3 < 1.10 \quad (3b)$$

$$4.10 < f1/|f2| < 5.00 \quad (4b)$$

$$6.00 < TDw/fw < 7.00 \quad (5b)$$

$$0.15 < fa/fb < 1.25 \quad (6b)$$

$$-1.16 < f4/f5 < -0.45 \quad (7b)$$

Subsequently, the configurations of the individual lens units will be described. In the embodiments, the first lens unit B1 includes and/or consists of a cemented lens including and/or consisting of a negative lens and a positive lens in order from the object side to the image side. The second lens unit B2 includes and/or consists of, in order from the object side to the image side, a negative lens, a negative lens, and a positive lens. This allows the effective diameter of the front lens to be reduced while achieving a wide angle of view.

In the first to fifth embodiments, the third lens unit B3 includes and/or consists of, in order from the object side to the image side, a positive lens, a positive lens, and a negative lens. This allows spherical aberration, coma aberration, and axial chromatic aberration to be suitably corrected in all zoom ranges while increasing the magnification varying action of the third lens unit B3.

In the first to fifth embodiments, the fourth lens unit B4 includes and/or consists of, in order from the object side to the image side, a positive lens, a negative lens, and a positive lens. The fifth lens unit B5 includes and/or consists of, in order from the object side to the image side, a positive lens and a negative lens. In the first to third embodiments and the fifth embodiment, the sixth lens unit B6 includes and/or consists of a single lens having positive refractive power.

Subsequently, numerical examples 1 to 5 corresponding to the first to fifth embodiments of the present invention, respectively, will be shown. In the individual numerical examples, reference sign i denotes the order of the optical surface counted from the object side, ri denotes the radius of curvature of an i-th optical surface (an i-th surface), di denotes the distance between the i-th surface and an i+1-th surface, ndi and vdi denote the refractive index and Abbe number of the material of an i-th optical element for d-line, respectively.

An aspherical shape x, with a displacement along an optical axis from a surface vertex at a height h from the optical axis, is expressed as:

$$x = (h^2/R)/[1+[1-(1+k)(h/R)^2]^{1/2}] + A4h^4 + A6h^6 + A8h^8$$

where k is eccentricity, A4, A6, and A8 are aspherical coefficients, and R is the radius of paraxial curvature. The expression "e-Z" denotes "$10^{-Z}$". In the numerical examples, two surfaces closest to the image side are the surfaces of an optical block, such as a filter or a face plate.

In the numerical examples, back focus (BF) is a distance from the surface of the lens system closest to the image side to a paraxial image plane, expressed as a length in free space (air). Table shows a summary of the conditions described above as applied and satisfied in the various numerical examples given.

The diameter of an effective image circle (the diameter of an image circle) at the wide-angle end can be smaller than the diameter of an effective image circle at the telephoto end. This is because barrel distortion, which tends to occur at the wide-angle end, can be corrected by expanding the image by image processing.

Numerical Example 1

| (Unit: mm) | | | | |
|---|---|---|---|---|
| Surface data | | | | |
| Surface number | r | d | nd | vd |
| 1 | 34.573 | 1.10 | 1.92286 | 18.9 |
| 2 | 27.262 | 5.00 | 1.77250 | 49.6 |
| 3 | 212.415 | (variable) | | |
| 4 | 688.425 | 0.75 | 1.91082 | 35.3 |
| 5 | 12.641 | 6.11 | | |
| 6 | −31.800 | 0.62 | 1.71300 | 53.9 |
| 7 | 43.958 | 0.06 | | |
| 8 | 30.719 | 2.26 | 1.95906 | 17.5 |

-continued (Unit: mm)

| | | | | |
|---|---|---|---|---|
| 9 | −2714.007 | (variable) | | |
| 10 | ∞ | −0.10 | | |
| 11* | 17.866 | 3.40 | 1.76802 | 49.2 |
| 12* | −197.635 | 0.34 | | |
| 13 | 12.234 | 3.15 | 1.48749 | 70.2 |
| 14 | 22.683 | 0.55 | 2.00069 | 25.5 |
| 15 | 11.111 | 4.71 | | |
| 16 (aperture) | ∞ | (variable) | | |
| 17* | 15.821 | 2.03 | 1.69350 | 53.2 |
| 18* | 68.004 | 0.80 | | |
| 19 | −65.000 | 0.65 | 1.80518 | 25.4 |
| 20 | 56.230 | 3.05 | 1.48749 | 70.2 |
| 21 | −17.207 | (variable) | | |
| 22 | 62.045 | 1.41 | 1.83400 | 37.2 |
| 23 | 248.502 | 2.00 | | |
| 24* | −18.164 | 0.70 | 1.85135 | 40.1 |
| 25* | 61.856 | (variable) | | |
| 26 | 31.261 | 3.80 | 1.91082 | 35.3 |
| 27 | −236.639 | (variable) | | |
| 28 | ∞ | 1.00 | 1.51633 | 64.1 |
| 29 | ∞ | 3.43 | | |
| Image plane | ∞ | | | |

Aspherical surface data

11th surface

K = 2.73940e−001  A4 = −3.21257e−005  A6 = −2.27136e−008

12th surface

K = 0.00000e+000  A4 = −8.68566e−006  A6 = 8.42296e−008

17th surface

K = 0.00000e+000  A4 = −3.81853e−006  A6 = 5.53546e−007
A8 = 8.74650e−009

18th surface

K = 0.00000e+000  A4 = 5.86535e−005  A6 = 7.68295e−007
A8 = 1.04881e−008

24th surface

K = 0.00000e+000  A4 = 4.42459e−005  A6 = 1.40797e−006
A8 = −1.95999e−008

25th surface

K = 0.00000e+000  A4 = 5.16516e−005  A6 = 7.56329e−007
A8 = −1.18781e−008

Data
Zoom ratio 4.73

| | Wide angle end | Intermediate point | Telephoto end |
|---|---|---|---|
| Focal length | 12.85 | 22.91 | 60.77 |
| F-number | 2.06 | 3.50 | 4.20 |
| Half angle of view | 35.50 | 24.54 | 10.49 |
| Image height | 9.17 | 10.46 | 11.25 |
| Overall lens length | 81.74 | 81.96 | 96.68 |
| BF | 7.33 | 12.35 | 12.38 |
| d3 | 1.05 | 6.35 | 17.19 |
| d9 | 22.76 | 10.72 | 0.42 |
| d16 | 2.03 | 2.08 | 1.30 |
| d21 | 1.92 | 3.76 | 9.74 |
| d25 | 3.93 | 3.97 | 12.94 |
| d27 | 3.25 | 8.27 | 8.29 |

Zoom-lens-unit data

| Unit | First surface | Focal length |
|---|---|---|
| 1 | 1 | 55.87 |
| 2 | 4 | −12.51 |
| 3 | 11 | 27.86 |
| 4 | 17 | 23.57 |
| 5 | 22 | −20.47 |
| 6 | 26 | 30.52 |

Numerical Example 2

(Unit: mm)

Surface data

| Surface number | r | d | nd | vd |
|---|---|---|---|---|
| 1 | 44.365 | 1.10 | 1.92286 | 18.9 |
| 2 | 34.315 | 4.75 | 1.77250 | 49.6 |
| 3 | 457.662 | (variable) | | |
| 4 | 1719.360 | 0.75 | 1.91082 | 35.3 |
| 5 | 13.856 | 6.56 | | |
| 6 | −29.218 | 0.62 | 1.71300 | 53.9 |
| 7 | 83.172 | 0.06 | | |
| 8 | 39.750 | 2.39 | 1.95906 | 17.5 |
| 9 | −171.518 | (variable) | | |
| 10 | ∞ | −0.10 | | |
| 11* | 18.439 | 3.47 | 1.76802 | 49.2 |
| 12* | −339.588 | 0.10 | | |
| 13 | 11.794 | 3.15 | 1.48749 | 70.2 |
| 14 | 25.029 | 0.55 | 2.00069 | 25.5 |
| 15 | 12.538 | 4.37 | | |
| 16 (aperture) | ∞ | (variable) | | |
| 17* | 25.318 | 1.80 | 1.69350 | 53.2 |
| 18* | −390.423 | 1.14 | | |
| 19 | −17.856 | 0.65 | 1.80518 | 25.4 |
| 20 | −295.010 | 3.05 | 1.48749 | 70.2 |
| 21 | −15.006 | (variable) | | |
| 22 | 1094.585 | 2.66 | 1.93111 | 22.6 |
| 23 | −44.649 | 1.83 | | |
| 24* | −13.136 | 0.70 | 1.85135 | 40.1 |
| 25* | −27.510 | (variable) | | |
| 26 | 40.000 | 3.00 | 1.52963 | 47.2 |
| 27 | 200.000 | (variable) | | |
| 28 | ∞ | 1.03 | 1.51633 | 64.1 |
| 29 | ∞ | 3.66 | | |
| Image plane | ∞ | | | |

Aspherical surface data

11th surface

K = 4.66436e−001  A4 = −1.27854e−005  A6 = 2.55056e−008

12th surface

K = 0.00000e+000  A4 = 1.21639e−005  A6 = 5.09743e−008

17th surface

K = 0.00000e+000  A4 = 1.58326e−005  A6 = 4.66063e−007
A8 = 3.17918e−009

18th surface

K = 0.00000e+000  A4 = 5.86535e−005  A6 = 7.68295e−007
A8 = 1.04881e−008

24th surface

K = 0.00000e+000  A4 = 3.80735e−005  A6 = 1.93897e−006
A8 = −1.27122e−008

25th surface

K = 0.00000e+000  A4 = 1.25889e−005  A6 = 1.26020e−006
A8 = −9.71616e−009

Data
zoom ratio 4.89

| | Wide angle end | Intermediate point | Telephoto end |
|---|---|---|---|
| Focal length | 12.84 | 22.91 | 62.76 |
| F-number | 2.06 | 3.50 | 4.02 |
| Half angle of view | 35.53 | 24.55 | 10.16 |
| Image height | 9.17 | 10.46 | 11.25 |
| Overall lens length | 86.07 | 86.39 | 104.82 |
| BF | 7.03 | 12.90 | 18.88 |
| d3 | 0.84 | 6.97 | 21.03 |
| d9 | 26.90 | 13.58 | 1.02 |
| d16 | 1.87 | 1.75 | 1.31 |
| d21 | 1.79 | 3.32 | 11.72 |

-continued (Unit: mm)

| | | | |
|---|---|---|---|
| d25 | 4.68 | 4.90 | 7.88 |
| d27 | 2.70 | 8.56 | 14.55 |

Zoom-lens-unit data

| Unit | First surface | Focal length |
|---|---|---|
| 1 | 1 | 67.21 |
| 2 | 4 | −14.63 |
| 3 | 11 | 25.22 |
| 4 | 17 | 51.88 |
| 5 | 22 | −96.81 |
| 6 | 26 | 93.80 |

Numerical Example 3

(Unit: mm)

Surface data

| Surface number | r | d | nd | νd |
|---|---|---|---|---|
| 1 | 43.599 | 1.10 | 1.92286 | 18.9 |
| 2 | 35.896 | 3.95 | 1.77250 | 49.6 |
| 3 | 379.857 | (variable) | | |
| 4 | 1069.762 | 0.75 | 1.91082 | 35.3 |
| 5 | 14.173 | 7.08 | | |
| 6 | −28.310 | 0.62 | 1.71300 | 53.9 |
| 7 | 157.582 | 0.06 | | |
| 8 | 43.501 | 2.42 | 1.95906 | 17.5 |
| 9 | −171.015 | (variable) | | |
| 10 | ∞ | −0.10 | | |
| 12* | −1466.655 | 0.10 | | |
| 13 | 10.679 | 3.14 | 1.48749 | 70.2 |
| 14 | 22.180 | 0.55 | 2.00069 | 25.5 |
| 15 | 12.295 | 4.41 | | |
| 16 (aperture) | ∞ | (variable) | | |
| 17* | 23.066 | 1.59 | 1.69350 | 53.2 |
| 18* | 122.895 | 1.25 | | |
| 19 | −16.090 | 0.65 | 1.80735 | 20.7 |
| 20 | 1006.124 | 3.05 | 1.48749 | 70.2 |
| 21 | −15.541 | (variable) | | |
| 22 | 564.056 | 3.00 | 1.95906 | 17.5 |
| 23 | −39.567 | 1.74 | | |
| 24* | −13.998 | 0.70 | 1.85135 | 40.1 |
| 25* | −32.209 | (variable) | | |
| 26 | 40.000 | 2.50 | 1.56689 | 37.8 |
| 27 | 200.000 | (variable) | | |
| 28 | ∞ | 1.03 | 1.51633 | 64.1 |
| 29 | ∞ | 3.99 | | |
| Image plane | ∞ | | | |

Aspherical surface data

11th surface

K = 7.50401e−001    A4 = −8.39257e−006    A6 = 2.97865e−008

12th surface

K = 0.00000e+000    A4 = 1.71600e−005    A6 = 6.09381e−008

17th surface

K = 0.00000e+000    A4 = −1.43003e−005    A6 = 2.79794e−007
A8 = −1.08486e−008

18th surface

K = 0.00000e+000    A4 = 5.86535e−005    A6 = 7.68295e−007
A8 = 1.04881e−008

24th surface

K = 0.00000e+000    A4 = 5.01861e−005    A6 = 1.98847e−006
A8 = −1.33183e−008

25th surface

-continued (Unit: mm)

K = 0.00000e+000    A4 = 2.77119e−005    A6 = 1.31249e−006
A8 = −1.02228e−008

Data
Zoom ratio 4.87

| | Wide angle end | Intermediate point | Telephoto end |
|---|---|---|---|
| Focal length | 12.86 | 22.92 | 62.68 |
| F-number | 2.06 | 3.50 | 4.02 |
| Half angle of view | 35.48 | 24.54 | 10.17 |
| Image height | 9.17 | 10.46 | 11.25 |
| Overall lens length | 86.23 | 85.25 | 103.52 |
| BF | 7.16 | 13.83 | 19.78 |
| d3 | 0.87 | 6.96 | 20.74 |
| d9 | 28.77 | 14.60 | 1.54 |
| d16 | 1.30 | 1.32 | 1.40 |
| d21 | 1.77 | 2.21 | 9.38 |
| d25 | 3.98 | 3.96 | 8.32 |
| d27 | 2.49 | 9.16 | 15.11 |

Zoom-lens-unit data

| Unit | First surface | Focal length |
|---|---|---|
| 1 | 1 | 66.24 |
| 2 | 4 | −15.42 |
| 3 | 11 | 23.17 |
| 4 | 17 | 120.38 |
| 5 | 22 | −152.57 |
| 6 | 26 | 87.70 |

Numerical Example 4

(Unit: mm)

Surface data

| Surface number | r | d | nd | νd |
|---|---|---|---|---|
| 1 | 45.910 | 1.10 | 1.92286 | 18.9 |
| 2 | 33.294 | 5.27 | 1.77886 | 45.3 |
| 3 | 526.873 | (variable) | | |
| 4 | −1350.514 | 0.75 | 1.91082 | 35.3 |
| 5 | 14.730 | 7.04 | | |
| 6 | −31.538 | 0.62 | 1.71300 | 53.9 |
| 7 | 121.920 | 0.06 | | |
| 8 | 42.345 | 2.53 | 1.95906 | 17.5 |
| 9 | −193.584 | (variable) | | |
| 10 | ∞ | −0.10 | | |
| 11* | 19.745 | 3.32 | 1.76802 | 49.2 |
| 12* | −314.415 | 0.10 | | |
| 13 | 11.193 | 2.69 | 1.48749 | 70.2 |
| 14 | 25.293 | 0.55 | 2.00069 | 25.5 |
| 15 | 13.110 | 4.96 | | |
| 16 (aperture) | ∞ | (variable) | | |
| 17* | 21.189 | 1.61 | 1.69350 | 53.2 |
| 18* | 67.777 | 1.08 | | |
| 19 | −26.514 | 0.65 | 1.77299 | 24.8 |
| 20 | 78.152 | 4.50 | 1.50190 | 68.5 |
| 21 | −18.190 | (variable) | | |
| 22 | −895.300 | 2.50 | 1.87471 | 18.9 |
| 23 | −52.314 | 1.82 | | |
| 24* | −12.434 | 0.70 | 1.85135 | 40.1 |
| 25* | −20.046 | (variable) | | |
| 26 | ∞ | 1.00 | 1.51633 | 64.1 |
| 27 | ∞ | 6.82 | | |
| Image plane | ∞ | | | |

Aspherical surface data

11th surface

-continued (Unit: mm)

| | | | |
|---|---|---|---|
| K = 6.45059e−001 | A4 = −1.56968e−005 | A6 = 2.42033e−008 | |

12th surface

| | | | |
|---|---|---|---|
| K = 0.00000e+000 | A4 = 3.71787e−006 | A6 = 7.01201e−008 | |

17th surface

| | | | |
|---|---|---|---|
| K = 0.00000e+000 | A4 = −1.11386e−005 | A6 = 3.79824e−007 | |
| A8 = 2.41366e−009 | | | |

18th surface

| | | | |
|---|---|---|---|
| K = 0.00000e+000 | A4 = 5.86535e−005 | A6 = 7.68295e−007 | |
| A8 = 1.04881e−008 | | | |

24th surface

| | | | |
|---|---|---|---|
| K = 0.00000e+000 | A4 = −1.22163e−005 | A6 = 3.95740e−006 | |
| A8 = −2.73442e−008 | | | |

25th surface

| | | | |
|---|---|---|---|
| K = 0.00000e+000 | A4 = −3.23890e−005 | A6 = 2.96566e−006 | |
| A8 = −2.20507e−008 | | | |

Data
Zoom ratio 4.86

| | Wide angle end | Intermediate point | Telephoto end |
|---|---|---|---|
| Focal length | 12.89 | 22.96 | 62.65 |
| F-number | 2.80 | 3.50 | 4.02 |
| Half angle of view | 35.42 | 24.49 | 10.18 |
| Image height | 9.17 | 10.46 | 11.25 |
| Overall lens length | 88.82 | 86.23 | 99.18 |
| BF | 11.68 | 17.64 | 24.63 |
| d3 | 0.97 | 6.61 | 20.93 |
| d9 | 30.34 | 15.36 | 0.36 |
| d16 | 1.66 | 1.64 | 1.31 |
| d21 | 2.07 | 2.89 | 9.85 |
| d25 | 4.20 | 10.16 | 17.15 |

Zoom-lens-unit data

| Unit | First surface | Focal length |
|---|---|---|
| 1 | 1 | 69.28 |
| 2 | 4 | −16.03 |
| 3 | 11 | 25.04 |
| 4 | 17 | 53.28 |
| 5 | 22 | −114.86 |

Numerical Example 5

(Unit: mm)

Surface data

| Surface number | r | d | nd | vd |
|---|---|---|---|---|
| 1 | 38.064 | 1.10 | 1.92286 | 18.9 |
| 2 | 29.007 | 5.54 | 1.77250 | 49.6 |
| 3 | 302.701 | (variable) | | |
| 4 | 2065.777 | 0.75 | 1.91082 | 35.3 |
| 5 | 12.734 | 6.03 | | |
| 6 | −29.048 | 0.62 | 1.71300 | 53.9 |
| 7 | 61.331 | 0.06 | | |
| 8 | 37.169 | 2.16 | 1.95906 | 17.5 |
| 9 | −193.107 | (variable) | | |
| 10 | ∞ | −0.10 | | |
| 11* | 19.443 | 3.38 | 1.76802 | 49.2 |
| 12* | −92.597 | 0.10 | | |
| 13 | 12.045 | 3.15 | 1.48749 | 70.2 |
| 14 | 21.258 | 0.55 | 2.00069 | 25.5 |
| 15 | 11.484 | 4.29 | | |
| 16 (aperture) | ∞ | (variable) | | |
| 17* | 21.182 | 1.93 | 1.69350 | 53.2 |
| 18* | 1853.191 | 0.81 | | |
| 19 | −30.616 | 0.65 | 1.80518 | 25.4 |
| 20 | 160.165 | 3.05 | 1.48749 | 70.2 |
| 21 | −15.148 | (variable) | | |
| 22 | 66.752 | 1.41 | 1.83400 | 37.2 |
| 23 | 192.302 | 1.76 | | |
| 24* | −14.629 | 0.70 | 1.85135 | 40.1 |
| 25* | −99.212 | (variable) | | |
| 26 | 37.770 | 3.67 | 1.91082 | 35.3 |
| 27 | −280.579 | (variable) | | |
| 28 | ∞ | 1.03 | 1.51633 | 64.1 |
| 29 | ∞ | 3.66 | | |
| Image plane | ∞ | | | |

Aspherical surface data

11th surface

| | | | |
|---|---|---|---|
| K = −7.80525e−002 | A4 = −1.88569e−005 | A6 = 2.09651e−008 | |

12th surface

| | | | |
|---|---|---|---|
| K = 0.00000e+000 | A4 = 7.95782e−007 | A6 = 4.55832e−008 | |

17th surface

| | | | |
|---|---|---|---|
| K = 0.00000e+000 | A4 = 1.85119e−005 | A6 = 5.10787e−007 | |
| A8 = 8.31057e−009 | | | |

18th surface

| | | | |
|---|---|---|---|
| K = 0.00000e+000 | A4 = 5.86535e−005 | A6 = 7.68295e−007 | |
| A8 = 1.04881e−008 | | | |

24th surface

| | | | |
|---|---|---|---|
| K = 0.00000e+000 | A4 = 3.65015e−005 | A6 = 1.92219e−006 | |
| A8 = −2.21730e−008 | | | |

25th surface

| | | | |
|---|---|---|---|
| K = 0.00000e+000 | A4 = 3.66014e−005 | A6 = 1.05756e−006 | |
| A8 = −1.38498e−008 | | | |

Data
Zoom ratio 4.72

| | Wide angle end | Intermediate point | Telephoto end |
|---|---|---|---|
| Focal length | 12.84 | 22.86 | 60.62 |
| F-number | 2.06 | 3.50 | 4.02 |
| Half angle of view | 35.53 | 24.59 | 10.51 |
| Image height | 9.17 | 10.46 | 11.25 |
| Overall lens length | 81.68 | 82.43 | 97.16 |
| BF | 7.40 | 12.76 | 12.76 |
| d3 | 0.96 | 6.59 | 18.45 |
| d9 | 23.06 | 11.02 | 0.43 |
| d16 | 2.25 | 2.34 | 1.34 |
| d21 | 1.67 | 3.29 | 9.82 |
| d25 | 4.37 | 4.44 | 12.37 |
| d27 | 3.06 | 8.42 | 8.43 |

Zoom-lens-unit data

| Unit | First surface | Focal length |
|---|---|---|
| 1 | 1 | 59.63 |
| 2 | 4 | −12.93 |
| 3 | 11 | 24.90 |
| 4 | 17 | 28.12 |
| 5 | 22 | −24.96 |
| 6 | 26 | 36.75 |

TABLE

| | EXAMPLE 1 | EXAMPLE 2 | EXAMPLE 3 | EXAMPLE 4 | EXAMPLE 5 |
|---|---|---|---|---|---|
| f2/fa | −0.31 | −0.07 | −0.95 | −0.90 | −0.50 |

TABLE-continued

|  | EXAMPLE 1 | EXAMPLE 2 | EXAMPLE 3 | EXAMPLE 4 | EXAMPLE 5 |
|---|---|---|---|---|---|
| f5/fb | −0.63 | −1.87 | −1.94 | −1.31 | −0.63 |
| M3/f3 | 0.76 | 0.97 | 1.07 | 0.81 | 0.83 |
| f1/|f2| | 4.47 | 4.59 | 4.30 | 4.32 | 4.61 |
| TDw/Fw | 6.36 | 6.70 | 6.70 | 6.89 | 6.36 |
| fa/fb | 1.24 | 0.41 | 0.21 | 0.20 | 0.65 |
| f4/f5 | −1.15 | −0.54 | −0.79 | −0.46 | −1.13 |

Next, an example of a digital still camera that uses a zoom lens of any of the embodiments of the present invention as an image-pickup optical system will now be described with reference to FIG. 11.

In FIG. 11, reference sign 20 denotes a camera body, 21 denotes an image-pickup optical system, which is one of the zoom lenses described in the first to fifth embodiments; 22 denotes a solid-state image sensor (photoelectric conversion element), such as a CCD sensor or a CMOS sensor, which is housed in the camera body 20 and receives an image of a subject formed by the image-pickup optical system 21; 23 denotes a memory that stores information corresponding to a subject image that is photoelectrically converted by the solid-state image sensor 22; 24 denotes a viewfinder, for example, a liquid-crystal display panel, for observing a subject image formed on the solid-state image sensor 22.

Application of a zoom lens according to some embodiments of the present invention to an image pickup apparatus of a digital still camera allows a compact, wide-angle-of-view image pickup apparatus having high optical performance in all zoom ranges to be provided.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-017754, filed Jan. 31, 2014, which is hereby incorporated by reference herein in its entirety.

What is claimed is:

1. A zoom lens comprising, in order from an object side of the zoom lens to an image side of the zoom lens:
   a first lens unit having positive refractive power;
   a second lens unit having negative refractive power;
   a third lens unit having positive refractive power;
   an aperture stop;
   a fourth lens unit having positive refractive power; and
   a fifth lens unit having negative refractive power,
   wherein: (i) a distance between adjacent lens units of the zoom lens changes during zooming;
   (ii) the third lens unit includes at least one positive lens and further includes at least one negative lens at the image side with respect to the positive lens; and
   (iii) following conditions are satisfied;

$-4.00 < f2/fa < -0.26$ $-5.00 < f5/fb < -0.27$ where f2 is a focal length of the second lens unit, f5 is a focal length of the fifth lens unit, fa is a combined focal length of lenses disposed at the object side with respect to the aperture stop at a wide-angle end, and fb is a combined focal length of lenses disposed at the image side with respect to the aperture stop at the wide-angle end.

2. The zoom lens according to claim 1, wherein a following condition is satisfied:

$0.05 < M3/f3 < 2.00$ where M3 is an amount of movement of the third lens unit during zooming from the wide-angle end to a telephoto end, and f3 is a focal length of the third lens unit.

3. The zoom lens according to claim 1, wherein a following condition is satisfied:

$3.00 < f1/|f2| < 6.00$ where f1 is a focal length of the first lens unit.

4. The zoom lens according to claim 1, wherein a following condition is satisfied:

$2.00 < TDw/fw < 11.00$ where TDw is a distance on an optical axis at the wide-angle end between an object side surface of a lens disposed closest to the object side of the first lens unit and an image plane, and fw is a focal length of an entire system at the wide-angle end.

5. The zoom lens according to claim 1, wherein a following condition is satisfied:

$0.05 < fa/fb < 3.00.$

6. The zoom lens according to claim 1, wherein a following condition is satisfied:

$-4.00 < f4/f5 < -0.05$ where f4 is a focal length of the fourth lens unit.

7. The zoom lens according to claim 1, further comprising a sixth lens unit having positive refractive power and being located or disposed after the fifth lens unit at or towards the image side with respect to the fifth lens unit.

8. The zoom lens according to claim 1, wherein the zoom lens is configured to form an image on a solid-state image sensor.

9. An image pickup apparatus comprising:
   a zoom lens; and
   an image sensor configured to receive an image formed by the zoom lens,
   wherein the zoom lens comprises, in order from an object side of the zoom lens to an image side of the zoom lens:
      a first lens unit having positive refractive power;
      a second lens unit having negative refractive power;
      a third lens unit having positive refractive power;
      an aperture stop;
      a fourth lens unit having positive refractive power; and
      a fifth lens unit having negative refractive power,
   wherein: (i) a distance between adjacent lens units of the zoom lens changes during zooming;
   (ii) the third lens unit includes at least one positive lens and further includes at least one negative lens at the image side with respect to the positive lens; and
   (iii) following conditions are satisfied;

$-4.00 < f2/fa < -0.26$ $-5.00 < f5/fb < -0.27$ where f2 is a focal length of the second lens unit, f5 is a focal length of the fifth lens unit, fa is a combined focal length of lenses disposed at the object side with respect to the aperture stop at a wide-angle end, and fb is a combined focal length of lenses disposed at the image side with respect to the aperture stop at the wide-angle end.

* * * * *